United States Patent [19]

Wildes et al.

[11] Patent Number: 5,317,965
[45] Date of Patent: Jun. 7, 1994

[54] BALER FOR POLYSTYRENE MATERIAL

[75] Inventors: Forrest Wildes; Wayne Maki, both of Baxley; Chris A. Jefferson, Hazlehurst, all of Ga.

[73] Assignee: Harris Waste Management Group, Inc., Minneapolis, Minn.

[21] Appl. No.: 868,771

[22] Filed: Apr. 15, 1992

Related U.S. Application Data

[63] Continuation-in-part of Ser. No. 831,430, Feb. 8, 1992.

[51] Int. Cl.$^5$ ............................................... B30B 7/04
[52] U.S. Cl. ........................................ 100/42; 100/39; 100/97; 100/232; 100/249
[58] Field of Search ...................... 100/35, 39, 41, 42, 100/94–97, 232, 249, 252, 215

[56] References Cited

U.S. PATENT DOCUMENTS

| | | | |
|---|---|---|---|
| 3,408,927 | 11/1968 | Willock | 100/232 X |
| 4,057,010 | 11/1977 | Smith | 100/249 X |
| 4,601,238 | 7/1986 | Davis, Jr. et al. | 100/232 X |
| 4,661,290 | 4/1987 | Sauda et al. | 100/41 X |
| 4,787,308 | 11/1988 | Newsom et al. | 100/232 X |
| 4,961,375 | 10/1990 | Weder et al. | 100/215 X |

Primary Examiner—Stephen F. Gerrity
Attorney, Agent, or Firm—Kirkpatrick & Lockhart

[57] ABSTRACT

A baler for baling polystyrene material which has a high bulk and low weight for subsequent recycling. The baler includes a ram, to compress the material past its form memory, which provides significant penetration over repeated cycles to compress the polystyrene into a bale, which is subsequently ejected through a bale door of the baler. The baler can either be manually controlled or automatically controlled, such as by an algorithm stored in a programmable logic controller. Feedback systems measure the length of travel of the ram and the pressure of the ram to determine the status of the baling operation, and can automatically provide for ejection of the baled material. The bale can either be manually strapped, automatically strapped, or no strapping of the bale may be required. The polystyrene material is chopped by a chopper system on the baler to break the material into smaller sections for baling. The baler also includes a vertical tamper to tamp the polystyrene down into the baling chamber.

5 Claims, 36 Drawing Sheets

Microfiche Appendix Included
(2 Microfiche, 2 Pages)

| ITEM | QTY | DESCRIPTION | PART # | INV. # |
|---|---|---|---|---|
| 1 | 1 | 50 HP 326TC MOTOR | CM4115T | D1-014 |
| 2 | 1 | 50 HP DOUBLE PUMP | 4525V50A211BB20282 | G5-045 |
| 3 | 1 | 50 HP MOTOR/PUMP CPL'G | MODEL 500 | H2-003 |
| 4 | 1 | 1/2" 4-BOLT UNLOADING VALVE | R5U-12-313-15-A1 | G4-023 |
| 5 | 1 | 1 1/2" 4-BOLT CHECK VALVE | C5V-12-321-A1 | G4-019 |
| 6 | 1 | 1" 4-BOLT RELIEF VALVE | R5V-08-313-12-A1 | G4-025 |
| 7 | 1 | 1" INLINE CHECK VALVE 65# | 3C15-8-65 | G4-007 |
| 8 | 1 | PRESSURE REDUCING VALVE | PBDB-FEN-ECA | G4-005 |
| 9 | 6 | PRESSURE GUAGE 0-3000 PSI | #7211-2 | G0-003 |
| 10 | 1 | PRESSURE TRANSDUCER | MOD K-1 | D5-010 |
| 11 | 1 | D06 SUBPLATE W/O RELIEF CART. | DO8SO16P | H1-001 |
| 12 | 1 | 3/4" DIRECTIONAL VALVE | DG5S8-8C-EWLB-20 | G4-087 |
| 13 | 3 | 3/8" FLOW CONTROL VALVE | F-600-S | G4-040 |
| 14 | 1 | D10 REGEN SUBPLATE | D-13674 | H1-004 |
| 15 | 1 | 1 1/4" DIRECTIONAL VALVE | DG5S4L-108C-E-W-B53 | G4-089 |
| 16 | 1 | 1 1/4" DIRECTIONAL VALVE | DG5S4L-106C-E-W-B53 | G4-086 |
| 17 | 1 | D02 SUBPLATE W/O RELIEF | D02 | H1-013 |
| 18 | 1 | VENT VALVE | DG4S4L-012A-WB-50 | G4-035 |
| 19 | 3 | 3" FILTER/SUCTION STRAINER | SS-300-0 | G9-013 |
| 20 | 1 | 5 HP. 1750 RPM. 184TC MOTOR | 5 HP | D1-006 |
| 21 | 1 | 5 HP MOTOR/PUMP CPL'G | PM-90 1 1/8" X 7/8" | H2-004 |
| 22 | 1 | 5 HP COOLING PUMP | 25V-17A-1A20-282 | G5-025 |
| 23 | 1 | FLOW DIVIDER | 2V14-6-4-25S | |
| 24 | 1 | AIR TO OIL COOLER | AO-40 | G9-003 |
| 25 | 1 | 1 1/2" BACK PRESS CHECK VALVE | LRV15-50 | G4-083 |
| 26 | 1 | FILTER DOUBLE ELEMENT | RT2-KS7-PPY2 | G9-031 |
| 27 | 1 | FILTERED BREATHER | ABF 3/10 | G9-032 |
| 28 | 1 | FLOAT SWITCH | L6EPB-BS3A | G0-012 |
| 29 | 1 | TEMPERATURE SWITCH | FM437-153-3516 | G0-013 |
| 30 | 1 | SIGHT GAUGE | PDLOT-05 | G0-006 |
| 31 | 1 | HYDRAULIC TANK | 2R-50 HP | |

PLC RACK LOCATION

| Label | Device | Address | Point |
|---|---|---|---|
| MASTER CONTROL RELAY | MCR | I:1.0/0 | 0 |
| COOLING SYSTEM | ON/OFF | I:1.0/1 | 1 |
| BALER MANUAL | MANUAL/AUTO | I:1.0/2 | 2 |
| BALER AUTO | | I:1.0/3 | 3 |
| DRIVE MOTOR MANUAL | MANUAL/AUTO | I:1.0/4 | 4 |
| DRIVE MOTOR AUTO | | I:1.0/5 | 5 |
| POLY BREAKER MANUAL | MANUAL/AUTO | I:1.0/6 | 6 |
| POLY BREAKER AUTO | | I:1.0/7 | 7 |
| CONVEYOR MANUAL | MANUAL/AUTO | I:1.0/8 | 8 |
| CONVEYOR AUTO | | I:1.0/9 | 9 |
| PLATEN FORWARD | PB 1 | I:1.0/10 | 10 |
| PLATEN REVERSE | PB 2 | I:1.0/11 | 11 |
| CLOSE BALE DOOR | PB 3 | I:1.0/12 | 12 |
| OPEN BALE DOOR | PB 4 | I:1.0/13 | 13 |
| EJECT BALE | PB 5 | I:1.0/14 | 14 |
| SILENCE ALARM | PB 6 | I:1.0/15 | 15 |
| START BALE | PB 7 | I:2.0/0 | 0 |
| HOPPER FULL EYE | PC 1 | I:2.0/1 | 1 |
| BALE DOOR UP | LS 1 | I:2.0/2 | 2 |
| BALE DOOR DOWN | LS 2 | I:2.0/3 | 3 |
| RAM CLEAR OF BALE DOOR | LS 3 | I:2.0/4 | 4 |
| HIGH PRESSURE SWITCH | PS 1 | I:2.0/5 | 5 |
| LOW OIL FLOAT SWITCH | FS 1 | I:2.0/6 | 6 |
| HIGH TEMP SWITCH | TEMP 1 | I:2.0/7 | 7 |
| WITH/WITHOUT TAMPER | WO/WITH | I:2.0/8 | 8 |
| TAMPER DOWN PB | PB 8 | I:2.0/9 | 9 |
| TAMPER UP PB | PB 9 | I:2.0/10 | 10 |
| TAMPER UP LS | LS 4 | I:2.0/11 | 11 |
| TAMPER DOWN LS | LS 5 | I:2.0/12 | 12 |
| UPPER HOPPER EYE | PE 2 | I:2.0/13 | 13 |
| LOW TEMP SWITCH | TEMP 2 | I:2.0/14 | 14 |
| SPARE | | I:2.0/15 | 15 |

PLC RACK LOCATION

| ITEM | QTY | DESCRIPTION | PART # | INV. # |
|---|---|---|---|---|
| 1 | 1 | 50 HP 326TC MOTOR | CM4115T | D1-014 |
| 2 | 1 | 50 HP DOUBLE PUMP | 4525V50A211BB20282 | G5-045 |
| 3 | 1 | 50 HP MOTOR/PUMP CPL'G | MODEL 500 | H2-003 |
| 4 | 1 | 1 1/2" 4-BOLT UNLOADING VALVE | RSU-12-313-15-A1 | G4-023 |
| 5 | 1 | 1 1/2" 4-BOLT CHECK VALVE | C5V-12-321-A1 | G4-019 |
| 6 | 1 | 1" 4-BOLT RELIEF VALVE | R5V-08-313-12-A1 | G4-025 |
| 7 | 1 | 1" INLINE CHECK VALVE 65# | 3C15-8-65 | G4-007 |
| 8 | 1 | PRESSURE REDUCING VALVE | PBDB-FEN-ECA | G4-005 |
| 9 | 6 | PRESSURE GUAGE 0-3000 PSI | #7211-2 | G0-003 |
| 10 | 1 | PRESSURE TRANSDUCER | MOD K-1 | D5-010 |
| 11 | 2 | D06 SUBPLATE W/O RELIEF CART. | D08S016P | H1-001 |
| 12 | 2 | 3/4" DIRECTIONAL VALVE | DG5S8-8C-EWLB-20 | G4-087 |
| 13 | 3 | 3/8" FLOW CONTROL VALVE | F-600-S | G0-040 |
| 14 | 1 | D10 REGEN SUBPLATE | D-13674 | H1-004 |
| 15 | 1 | 1 1/4" DIRECTIONAL VALVE | DG5S4L-108C-E-W-B53 | G4-089 |
| 16 | 1 | 1 1/4" DIRECTIONAL VALVE | DG5S4L-106C-E-W-B53 | G4-086 |
| 17 | 1 | D02 SUBPLATE W/O RELIEF | D02 | H1-013 |
| 18 | 1 | VENT VALVE | DG4S4L-012A-WB-50 | G4-035 |
| 19 | 3 | 3" FILTER/SUCTION STRAINER | SS-300-0 | G9-013 |
| 20 | 1 | 5 HP, 1750 RPM, 184TC MOTOR | 5 HP | D1-006 |
| 21 | 1 | 5 HP MOTOR/PUMP CPL'G | PM-90 1 1/8" X 7/8" | H2-004 |
| 22 | 1 | 5 HP COOLING PUMP | 25V-17A-1A20-282 | G5-025 |
| 23 | 1 | FLOW DIVIDER | 2V14-6-4-25S | G9-003 |
| 24 | 1 | AIR TO OIL COOLER | AO-40 | G4-083 |
| 25 | 1 | 1 1/2" BACK PRESS CHECK VALVE | LRV15-50 | G9-031 |
| 26 | 1 | FILTER DOUBLE ELEMENT | RT2-KS7-PPY2 | G9-032 |
| 27 | 1 | FILTERED BREATHER | ABF 3/10 | G0-012 |
| 28 | 1 | FLOAT SWITCH | L6EPB-BS3A | G0-013 |
| 29 | 1 | TEMPERATURE SWITCH | FM437-153-3516 | G0-006 |
| 30 | 1 | SIGHT GAUGE | PDLOT-05 | |
| 31 | 1 | HYDRAULIC TANK | 2R-50 HP | |

FIG. 19B

BALER FOR POLYSTYRENE MATERIAL

CROSS REFERENCES TO CO-PENDING APPLICATIONS

This application is a continuation-in-part of U.S. patent application Ser. No. 07/831,430, filed Feb. 8, 1992, (pending) entitled "Baler", to the same assignee as present patent application.

BACKGROUND OF THE INVENTION

1. Field of the Invention

The present invention is for a baler, and more particularly, pertains to a baler for expanded or foamed polystyrene. A first alternative embodiment of the present invention includes a polystyrene baler which compacts a bale to 26"×30"×50" to cost effectively produce a bale of the appropriate density to fill up a trailer of a tractor-trailer to maximum weight for transportation on a cost-effective basis to recycling centers.

2. Description of the Prior Art

Prior art balers have not been practical for baling polystyrene, or polyfoam because the ram did not have sufficient penetration through the baling chamber, and therefore, could not compress the material sufficiently. Therefore, high-volume and low-mass materials generally were very difficult to bale because of the lack of suitable ram penetration in the baling chamber. Bales made with prior art balers were unstable and tended to come apart even with careful handling.

Expanded polystyrene is a material of particular concern to environmentalists, as the material is of high volume and low mass, and is taking up considerable space in landfills. Polystyrene is used to package a wide assortment of products, such as washers, dryers, refrigerators, other household appliances, TVs, audiovisual equipment, model trains, and just about any other type of product which is shipped in a box. The packaging can range from small blocks measured in inches, to large shapes measured in feet. Polystyrene also comes in what is referred to as peanuts, spaghetti or denoted with other cute names, and is used as packing material to protect goods in boxes against damage in transit.

The wide diversity of sizes and shapes of polystyrene complicates the baling problem. Of course, it would be possible to sort polystyrene waste according to size and density, but this adds expense and complicates the salvage process.

The subsequent disposal of polystyrene is of very serious concern to the environmentalists, who in the past have had no real recourse but to see this type of packing material buried in landfills, wasting landfill space, which is now considered a precious, non-renewable natural resource.

One particular concern of baling polystyrene was to achieve a bale weight of a density so that a trailer of a tractor-trailer, also referred to as a semi, reached maximum trailer weight, while filling the trailer at the same time for the most economical cost of transportation. Prior art problems with baling recyclable materials is that the trailer would be full, but yet a maximum weight would not be reached for the trailer, which made the cost of transportation not only inefficient, but more importantly uneconomical. Polystyrene had not been able to be recycled, and since it only recently has been possible to recycle polystyrene, there has now been a need created to effectively bale polystyrene on a cost-efficient basis so that the economies were appropriate for transportation of baled polystyrene. Achieving the appropriate bale density for cost-efficient transportation was not only important, but is being demanded by the recycling industry, as well as the transportation industry.

The present invention overcomes the disadvantages of the prior art by providing a baling system for polystyrene packing material, where the bales of the polystyrene can then be recycled which saves, protects and preserves the environment.

SUMMARY OF THE INVENTION

The general purpose of the present invention is a baler for polystyrene material, having a ram with sufficient penetration in the baling chamber to provide for baling of material which had been impossible to bale satisfactorily.

The general purpose of the first alternative embodiment of the present invention is using a vertical tamper to tamp the polystyrene into the bale chamber. The tamper is vertically mounted above the bale chamber of the baler, and provides for achieving the maximum density of a bale for cost-effective and economical transportation from a baling site to a recycling site. A chopper chops the polystyrene prior to baling and feeding the polystyrene into the bale chamber for transport up the conveyor and into a point between the bale chamber and the tamper.

According to one embodiment, there is provided a baler with a conveyor for elevating materials to a chopper, and a chopper above the baling chamber for chopping materials into smaller pieces. The baling chamber includes a ram having sufficient penetration to fully compress bale material against a bale door. The compression stroke is repeated until the pressure of the ram is at a predetermined level and the bale is at a predetermined bale length based on the length of travel of the ram. The bale's physical structure is referred to as a horizontal long box. The bale can be manually strapped.

According to a first alternative embodiment of the present invention, there is provided a baler for baling polystyrene or other like materials including a longitudinal bale chamber with a ram at one end and a bale door at the other end. A vertical tamper is positioned above a top portion of the baler at an opening for feeding polystyrene into the bale chamber, and includes a tamper plate for tamping the polystyrene down into the charging box prior to a baling operation. A conveyor conveys material from a ground position up to a point between the vertical tamper and an opening in the top of the baler above the charging box and the ram. The conveyor can have a chopper at the lower end, closest to the floor and away from the baler, to chop pieces of polystyrene into smaller pieces suitable for baling.

Significant aspects and features of the present invention include a baler for baling of polystyrene packing material, which may vary from packing peanuts to large physical pieces which are used to pack appliances, such as washers, dryers, or refrigerators.

Another significant aspect and feature of the present invention is a baler which chops large-sized material of loose density, such as high-volume and low-density polystyrene.

A further significant aspect and feature of the present invention is a baler which bales material for subsequent recycling in an ecological manner while conserving energies and resources.

Additional significant aspects and features include the following:

Automatic bale sizing system—The baler's ram continuously builds each bale with a series of compression cycles. When the bale's determined length has been reached, sensors signal the ejection sequence.

Automatic baling cycle—This baler is equipped with a Harris controller, especially designed for the optimum baling efficiency of polystyrene foam materials. The operator can quickly select between several bailing pressures to match system setting to the incoming material.

Polystyrene chopper—Powerful rotary fingers rips and sizes incoming foam material for improved bailing efficiency to provide a maximum dimension of 12". The unit mounts on top of the charge hopper.

Complete bale ejection from chamber—Each bale is completely ejected out of the chamber and free from the baler. Bale dimensions are uniform. Changing from one material to another is easy.

Bale ejection ready horn—When the baler has sensed a bale is ready for the ejection sequence, the compression cycle stops and a horn sounds to alert the operator to tie and eject the bale.

Other features include replaceable wear surface construction, ship channel frame design, four wire allot design for bale tie off, and breaker bar system.

Still another significant aspect and feature of the present invention is to provide a baler for baling of polystyrene or other like density material, which achieves a preferred bale density in a preferred bale size to accommodate the proper loading of a trailer of a tractor-trailer so as to reach the appropriate road weight.

Still another significant aspect and feature of the present invention is a baler for polystyrene or other low-density, high-volume materials which obtains a preferred bale weight for various types of materials.

Still another significant aspect and feature of the present invention is the ability to bale polystyrene and obtain a bale rate in the range of 400–800 pounds.

Still another significant aspect and feature of the present invention is the ability to chop polystyrene or low-density materials to be baled at a convenient location prior to feeding these materials into the baler. In one particular example, and not to be construed as limiting of the present invention, a chopper mechanism is provided at a lower end of the conveyor prior to conveying the chopped materials, such as the polystyrene materials, upwardly into a point between the tamper and the upper open area of the baler.

Having thus described the embodiments of the present invention, it is a principal object hereof to provide a baler for baling materials.

One object of the present invention is to provide a baler with a chopper to chop polystyrene or other loose-density material prior to baling.

Another object of the present invention is to provide a baler with a ram with long penetration.

A further object of the present invention is a baler specially designed to uniformly densify and bale most ply foam materials in a high production environment. The high pressure hydraulic system delivers powerful compaction force, enough to compress polystyrene foam past the material's form memory. The compression ram travels to the bale ejection door to deliver uniform material compaction from the first cycle to the bale's last.

An additional object of the present invention is a baler to bale polystyrene material for subsequent recycling.

Still another object of the present invention is to provide a baler with a tamper in the load area of the baler for tamping polystyrene prior to a baling operation. The tamper can be used either before each operation, where the ram moves the material from the loading station into the baling chamber and forms the bale, or at the very end of a baling operation, where it is necessary to obtain a precompression of the loaded material prior to the forming of the end of the bale so that the end of the bale is properly formed and of a sufficient density at the end of the bale with respect to the density at the beginning of the bale.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 9 illustrates the alignment of FIGS. 10A, 10B, and 10C;

FIG. 12A and 12B illustrates the hydraulic schematic;

FIGS. 18A-18E illustrate the electromechanical circuitry;

FIG. 19A and 19B illustrates the hydraulic schematic; and,

DESCRIPTION OF THE PREFERRED EMBODIMENTS

Figure 1:
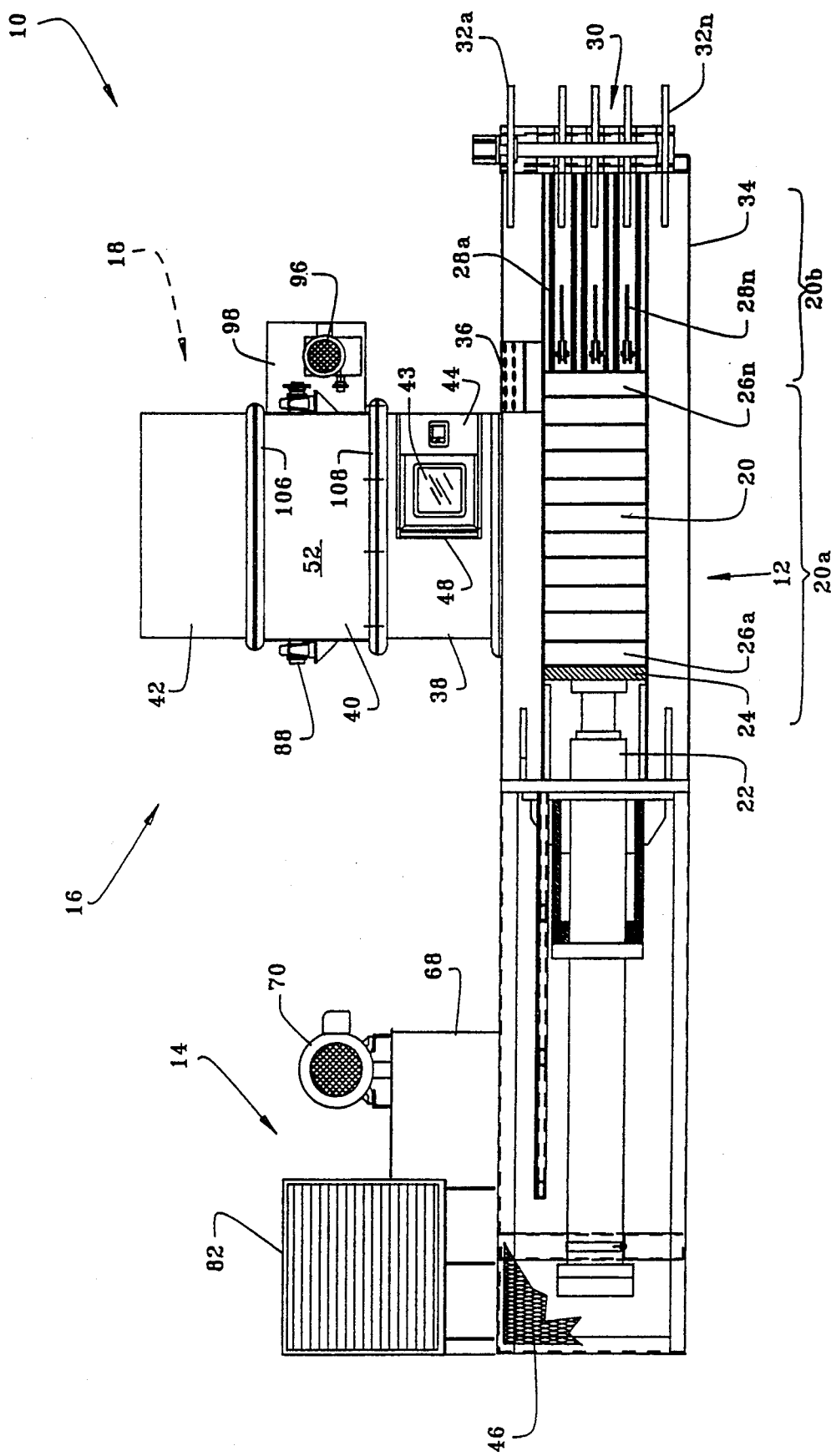
FIG. 1 illustrates a side view of the polystyrene baler.
Figure 2:
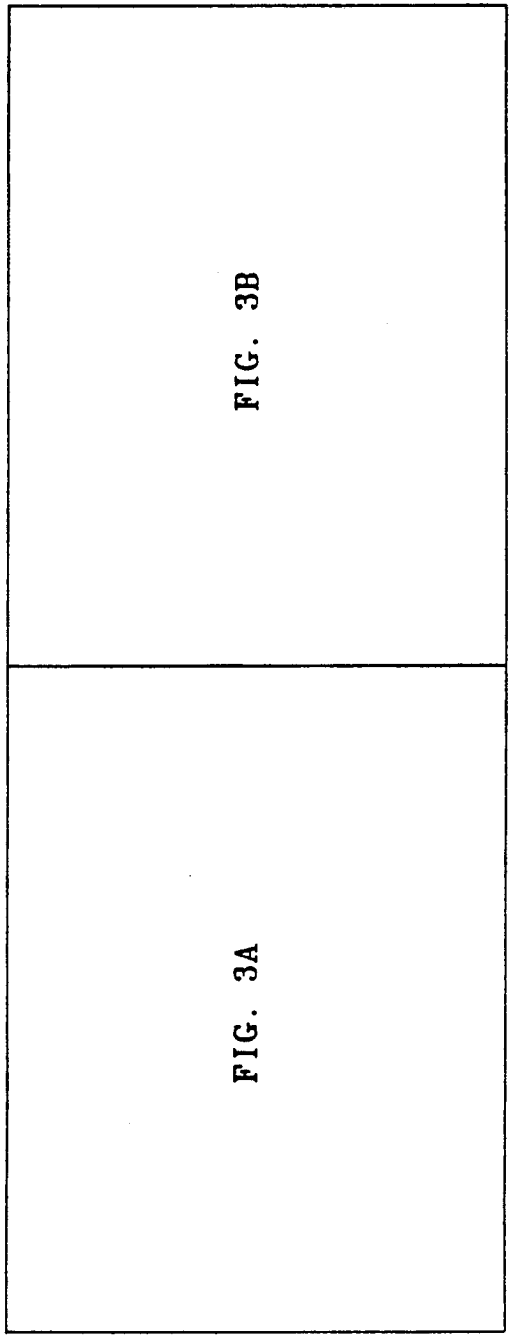
FIG. 2 illustrates the alignment of FIGS. 3A and 3B.
Figure 3A:
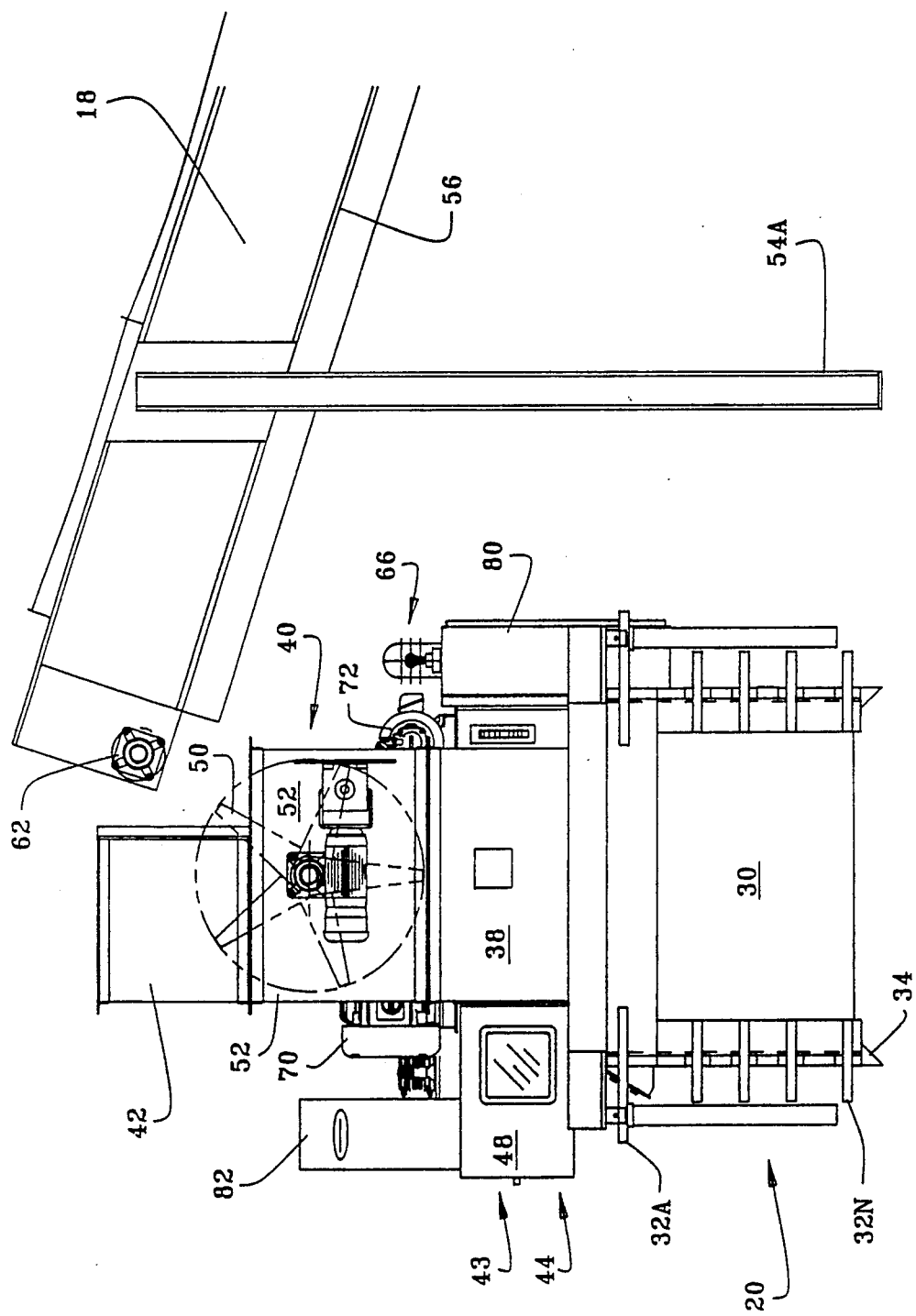
FIGS. 3A and 3B illustrate a side view of the polystyrene breaker.
Figure 3B:
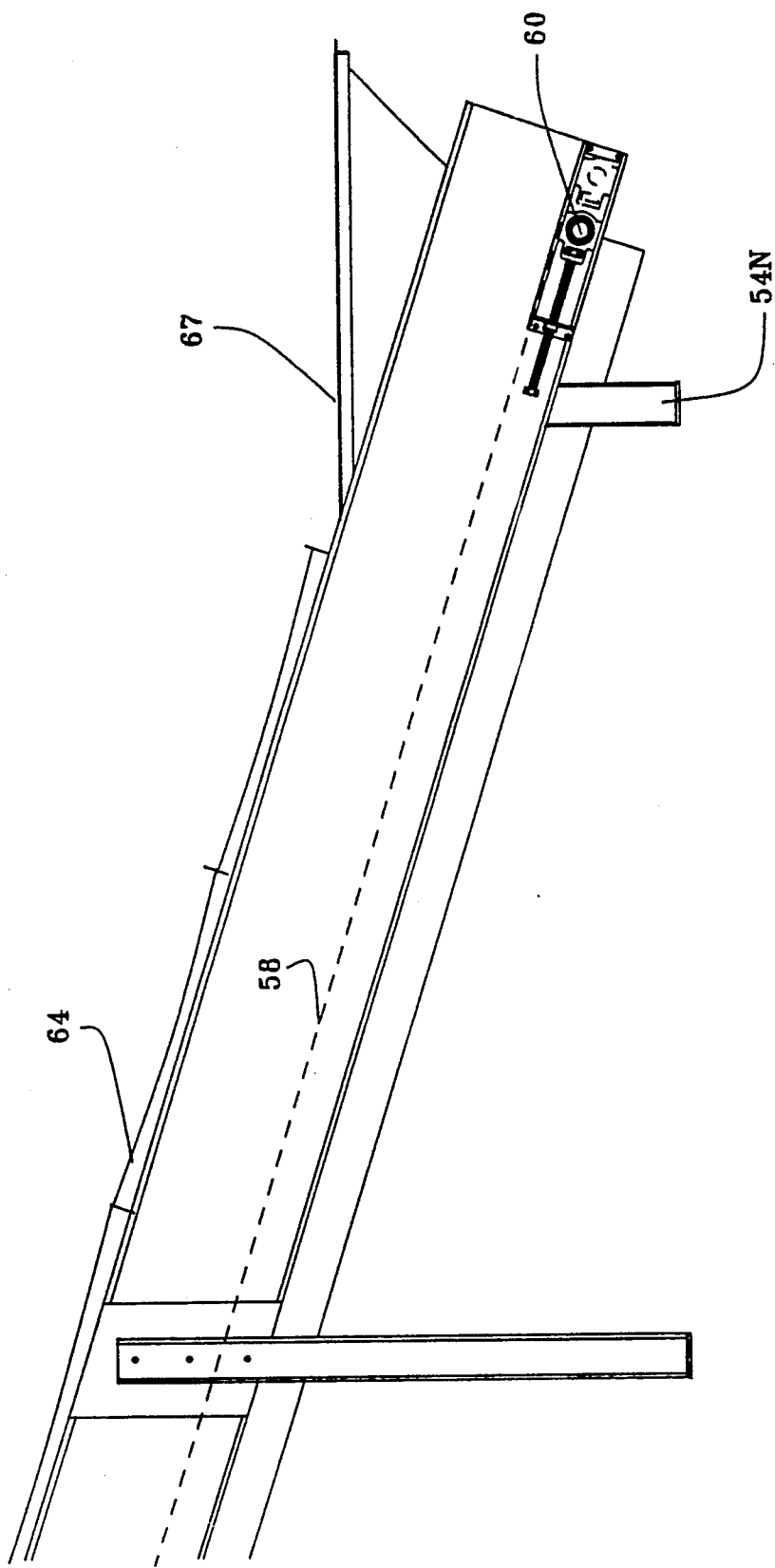

FIG. 1 illustrates a side view of a polystyrene baler 10, the present invention, generally including a baler 12, a hydraulic power unit 14, a loading area 16 and a conveyor 18 illustrated in FIGS. 3A and 3B. Polystyrene material to be baled is moved upon the conveyor 18 into the loading area 16, and is baled in the baling chamber 20 integral to the baler 12.

The baler 12, shown in cutaway view, includes a large hydraulic cylinder 22, a ram 24 aligned in the baling chamber 20 and secured to the hydraulic cylinder 22, a plurality of channels 26a-26n lining portion 20a of the baling chamber 20, a plurality of retaining dogs 28a-28n in portion 20b of the baling chamber 20, a vertically operated bale door 30, a plurality of reinforcement bars 32a-32n about the bale door 30 and a baler framework 34. A control panel 36 mounts on the upper region of the baler framework 34.

The loading area 16 includes a hopper 38 aligned generally over the portion 20a of the baling chamber 20, a polystyrene breaker 40 secured over and above the hopper 38 and a three-sided guide chute 42 secured over and above the polystyrene breaker 40. The polystyrene breaker 40 is described later in detail. A box-like structure 48, extending from hopper 38 includes an inspection window 43 on an access door 44. A protective screen 46 aligns over the left end of the baler framework 34.

PIG. 2 illustrates the alignment of FIGS. 3A and 3B.

FIGS. 3A and 3B illustrate a side view of the polystyrene breaker 40 where all numerals correspond to those elements previously described. A rotary chopper 50, which is an integral part of the polystyrene breaker 40 aligns in the polystyrene breaker enclosure 52 and is described later in detail. Also illustrated is the conveyor 18 including a plurality of legs 54a-54n supporting a framework 56. The conveyor 18 includes a powered belt 58 which aligns about opposing axles 60 and 62. A safety shut off wire 64 extends along both sides of the conveyor 18 to stop the conveyor 18 if an undesirable operating condition exists. A light 66 signals operation of the polystyrene baler 10 to warn personnel of system activation. A loading station 67 is also included at one end of the conveyor 18.

Figure 4:
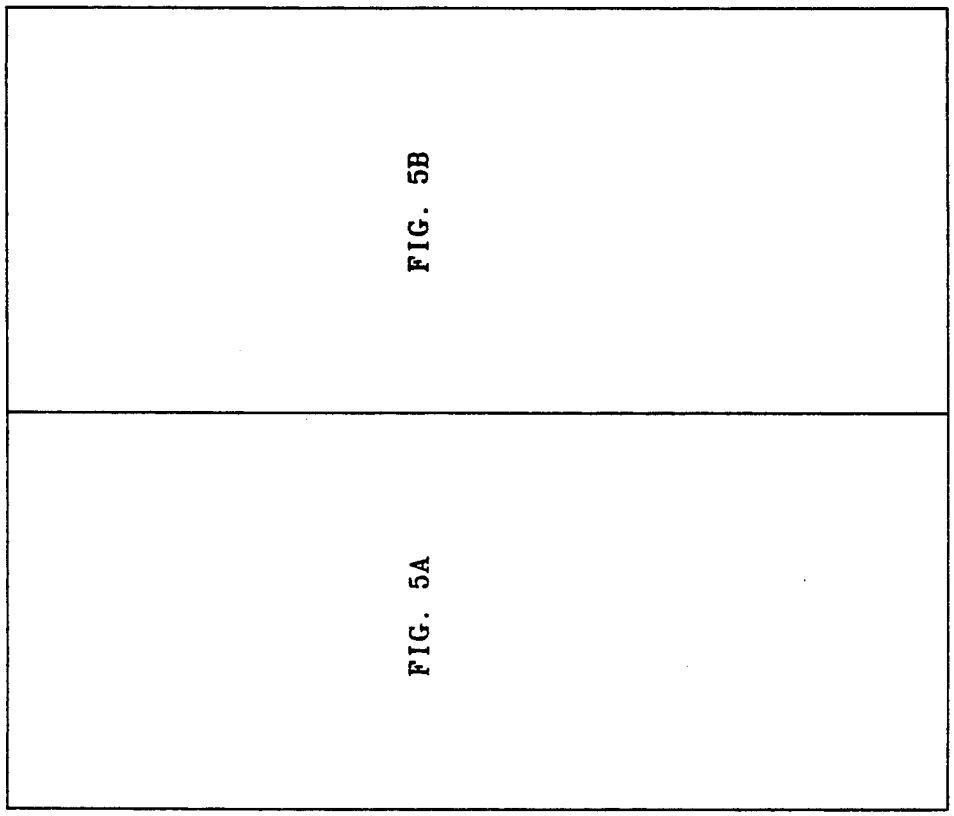
FIG. 4 illustrates the alignment of FIGS. 5A and 5B.
Figure 5A:
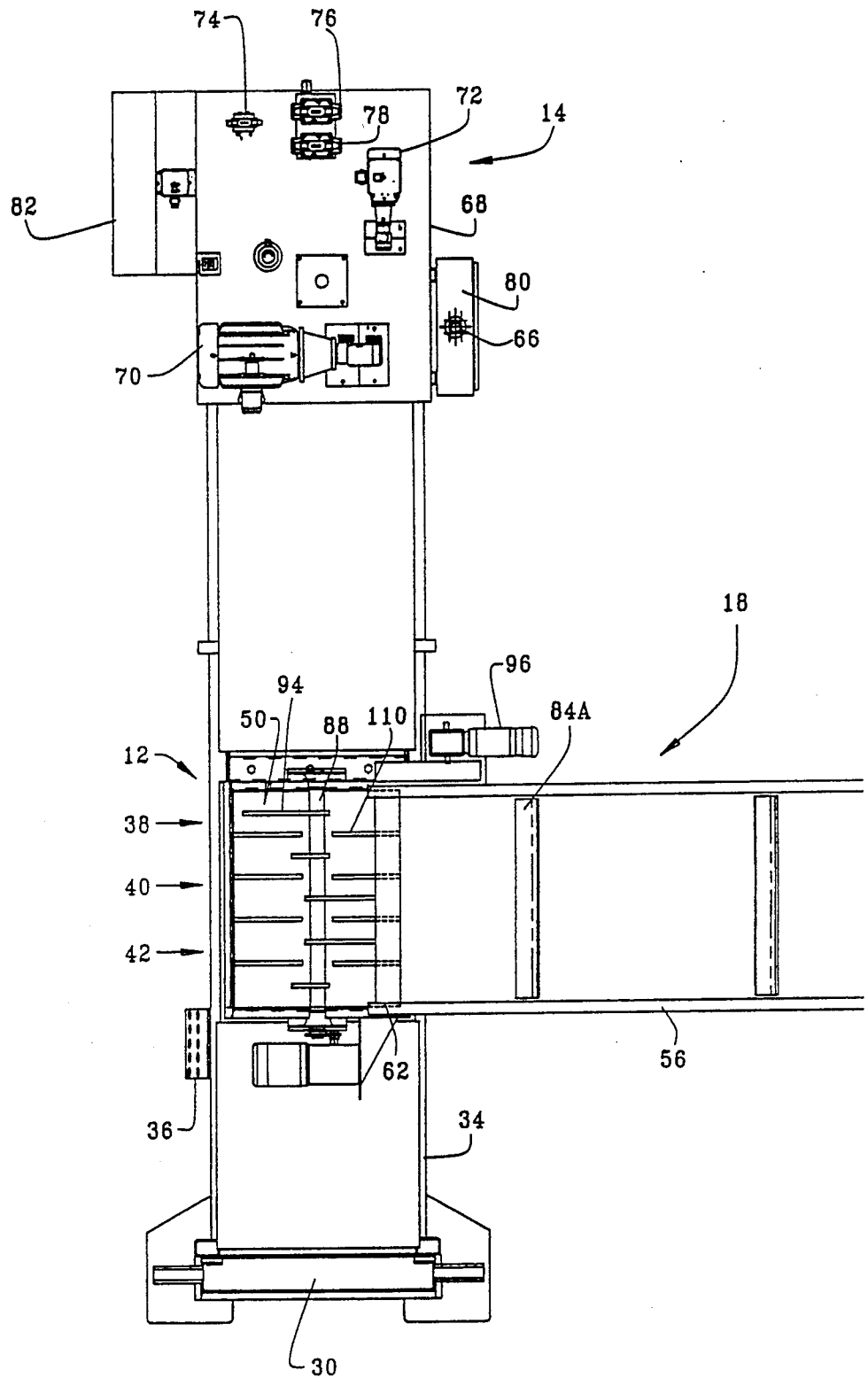
FIGS. 5A and 5B illustrate a top view of the polystyrene baler.
Figure 5B:
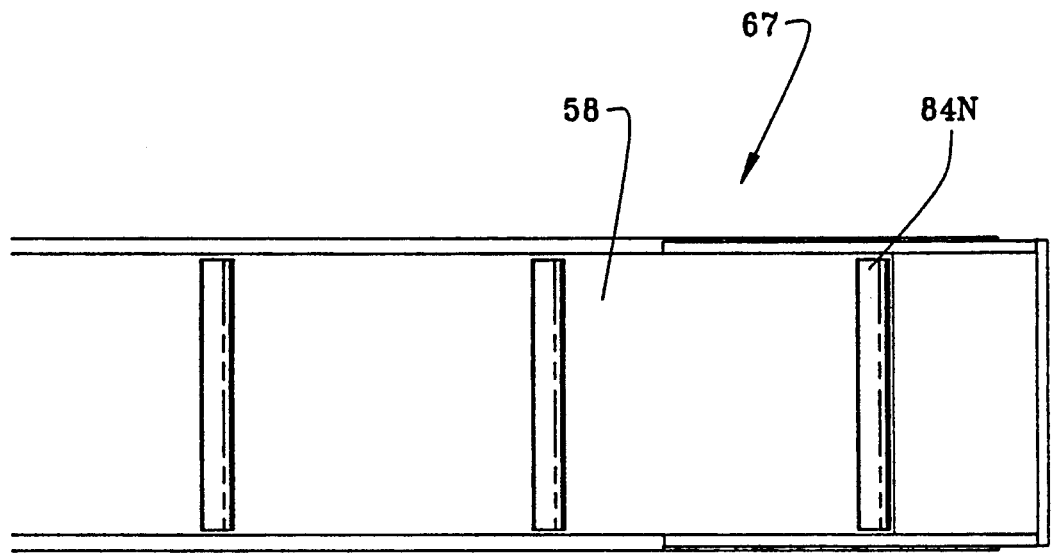

FIG. 4 illustrates the alignment of FIGS. 5A and 5B.

FIGS. 5A and 5B illustrate a top view of the polystyrene baler 10 where all numerals correspond to those elements previously described. For brevity and clarity of illustration, the box-like structure 48 including the access door 44 is not included. The hydraulic power unit 14 includes a hydraulic component mounting structure 68, hydraulic pumps 70 and 72, control valves 74, 76 and 78, and other assorted hydraulic devices. Also included are an electrical control panel 80 and an air-to-oil cooler 82. Also illustrated on the conveyor 18 are a plurality of cleats 84a-84n.

Figure 6:
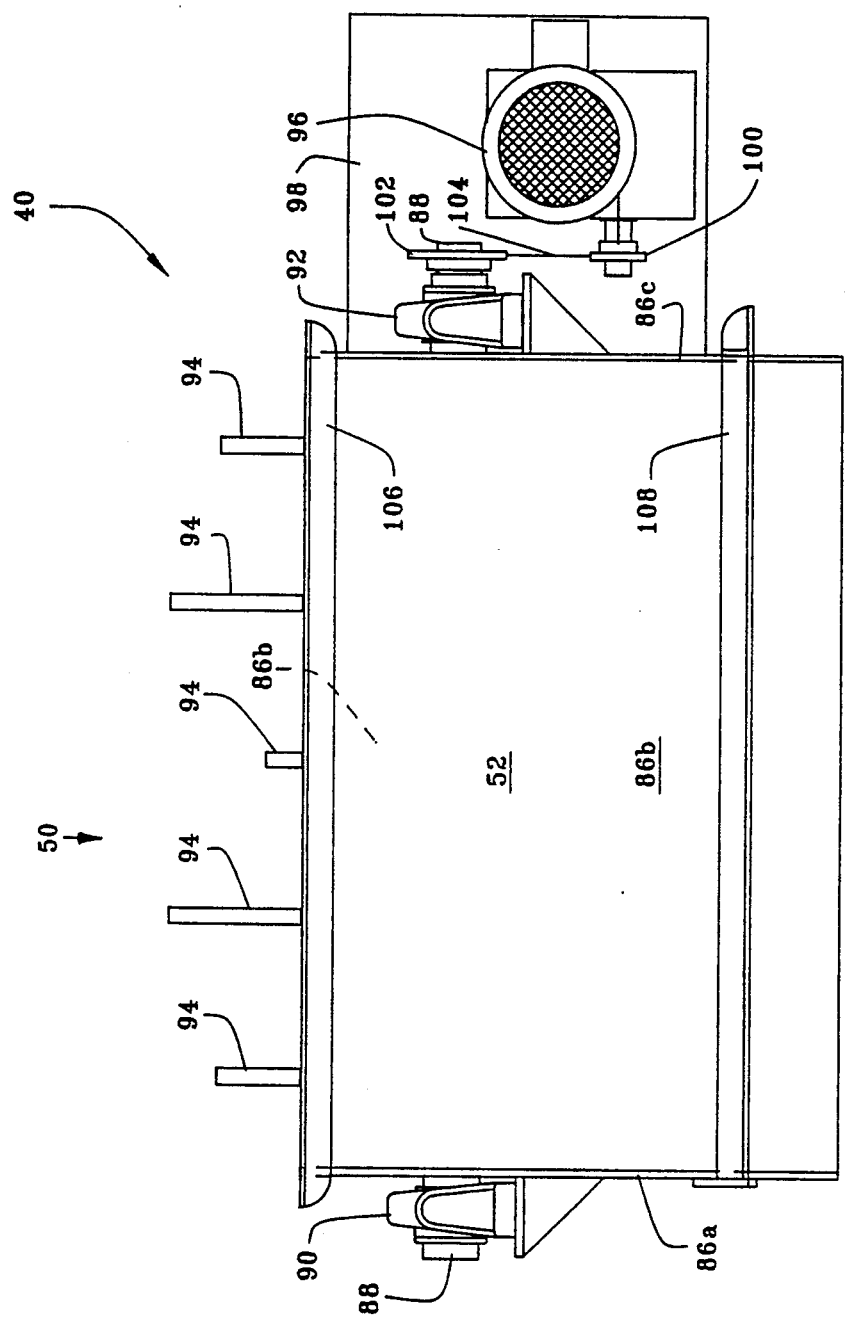
FIG. 6 illustrates a side view of the polystyrene breaker.
Figure 7:
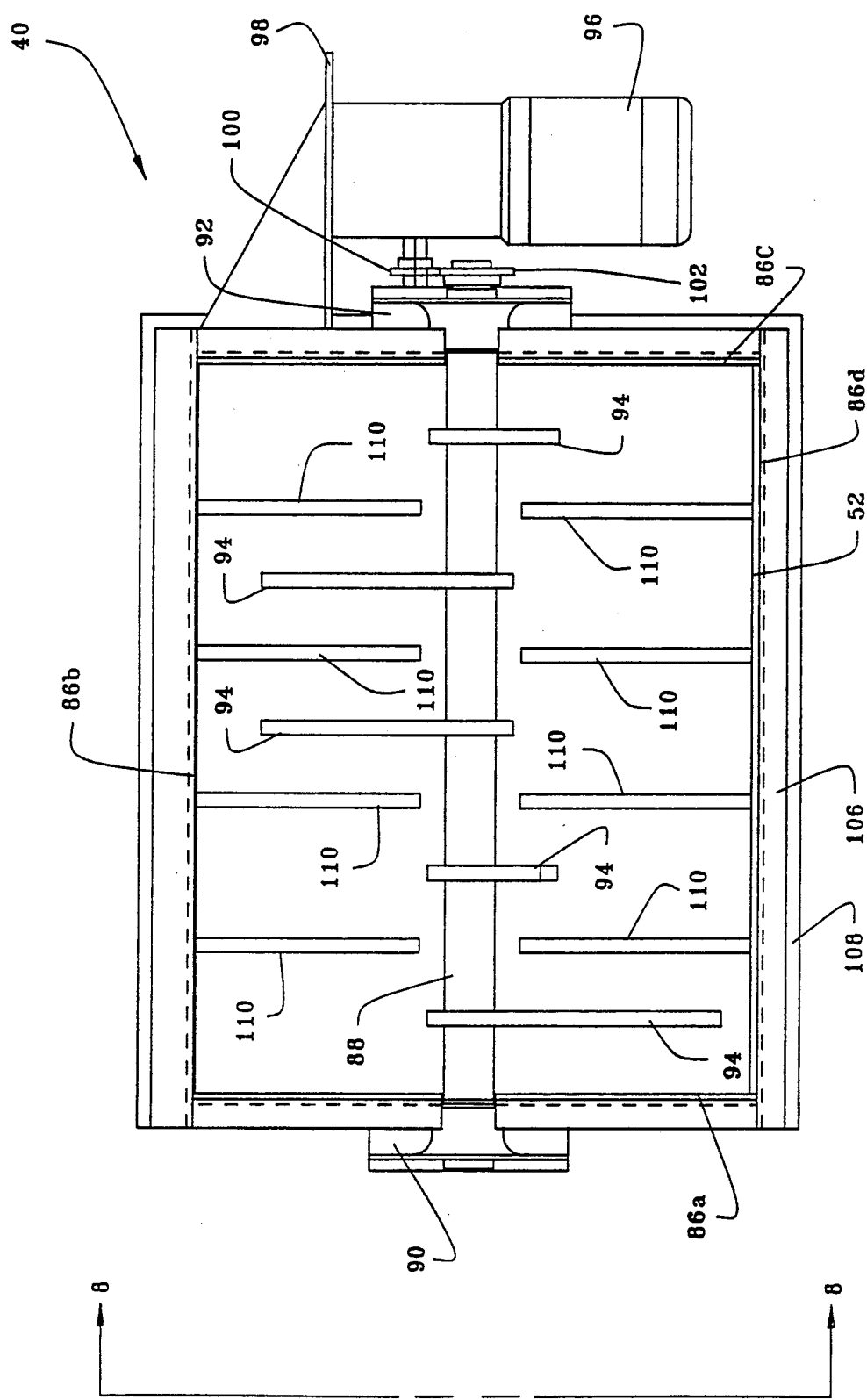
FIG. 7 illustrates a top view of the polystyrene breaker.
Figure 8:
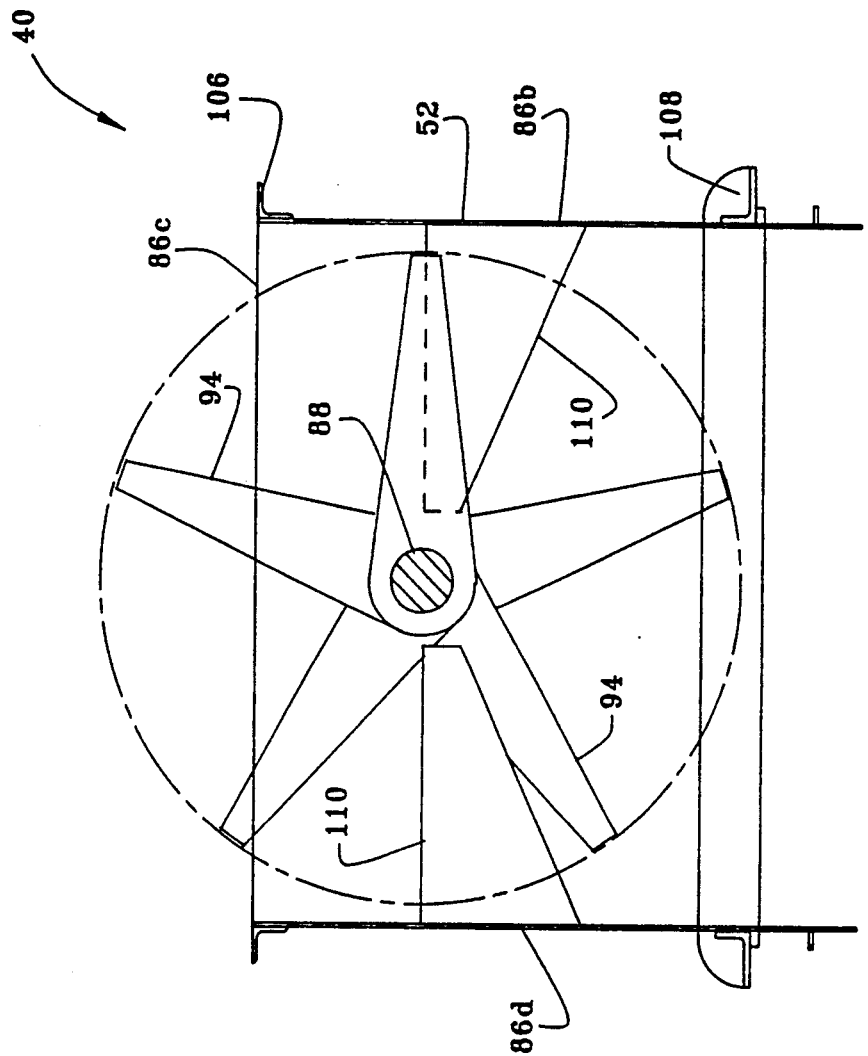
FIG. 8 illustrates an end view in cutaway of the polystyrene breaker along line 8—8 of FIG. 7.

FIG. 6 illustrates a side view of the polystyrene breaker 40 where all numerals correspond to those elements previously described. The polystyrene breaker enclosure 52 includes a plurality of vertical sides 86a-86c visible in this illustration and another side 86d opposing side 86b not illustrated. The rotary chopper 50 is partially enclosed in the polystyrene breaker enclosure 52 and includes a main shaft 88 rotationally secured to opposing bearings 90 and 92 on sides 86a and 86c of the polystyrene breaker enclosure 52. A plurality of like chopper arms 94 are offset from each other about the main shaft 88 as illustrated in FIGS. 7 and 8. A motor 96 secures to a mounting plate 98. A sprocket 100 on the motor 96 drives chain 104, and a sprocket 102 secures to the chopper main shaft 88. Upper and lower mounting flanges 106 and 108 surround the polystyrene breaker enclosure 52 to facilitate mounting to the corresponding flanges of the hopper 38 and the three-sided guide chute 42.

FIG. 7 illustrates a top view of the polystyrene breaker 40 where all numerals correspond to those elements previously described. Illustrated in particular is the intermeshing of the rotary chopper arms 94 with the like stationary chopping arms 110 extending from opposing sides 86b and 86d of the polystyrene breaker enclosure 52. Incoming polystyrene material is introduced into the top of the polystyrene breaker 40 and is broken up and crushed between the interleaved rotary chopper arms 94 and the stationary chopping arms 110 to be gravitationally deposited in the underlying hopper 38 and subsequently into the baling chamber 20 where it is compressed and baled.

FIG. 8 illustrates an end view in cutaway of the polystyrene breaker 40 along view line 8—8 of FIG. 7 where all numerals correspond to those elements previously described. Illustrated in particular are the angular displacement of the plurality of rotary chopper arms 94 which are spaced at 72° for purpose of illustration only and not to be construed as limiting of the scope of the invention, whereas any number of rotary chopper arms at either equal or staggered angular spacings may be incorporated to intermesh with any number of stationary chopping arms.

Figure 10A:
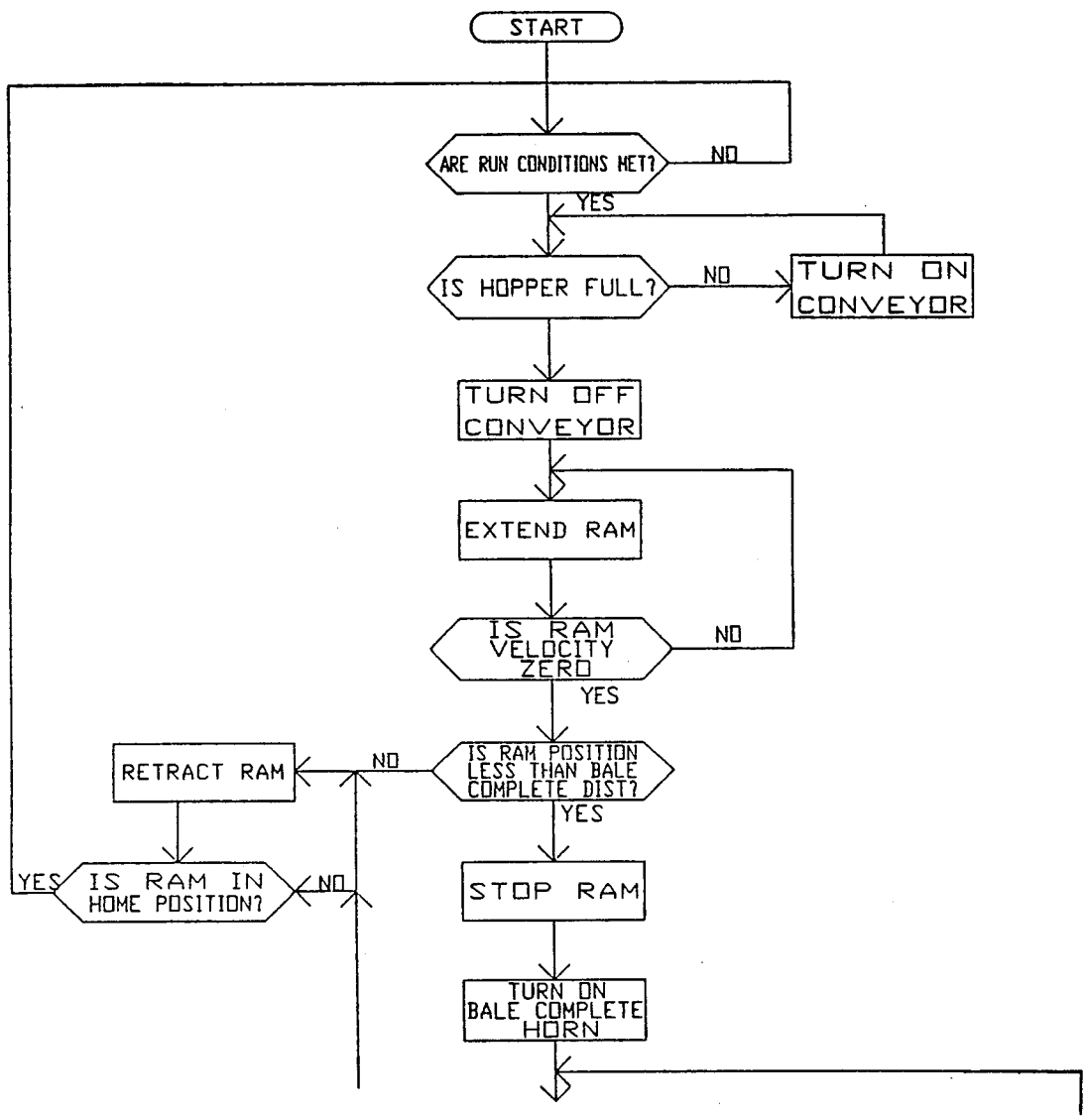
FIGS. 10A, 10B, and 10C illustrate a flow chart for electromechanical operation of the polystyrene baler.
Figure 10B:
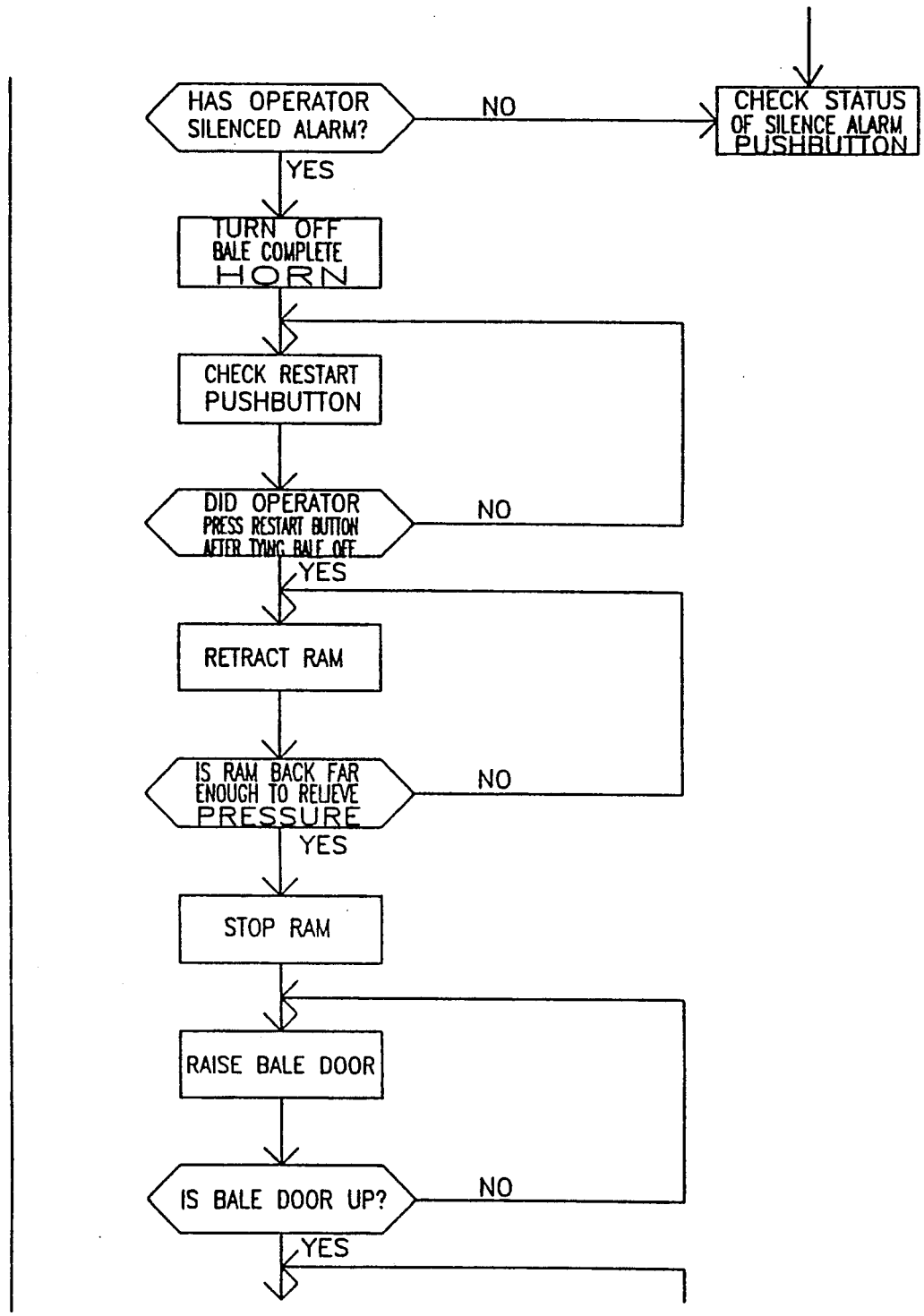
Figure 10C:
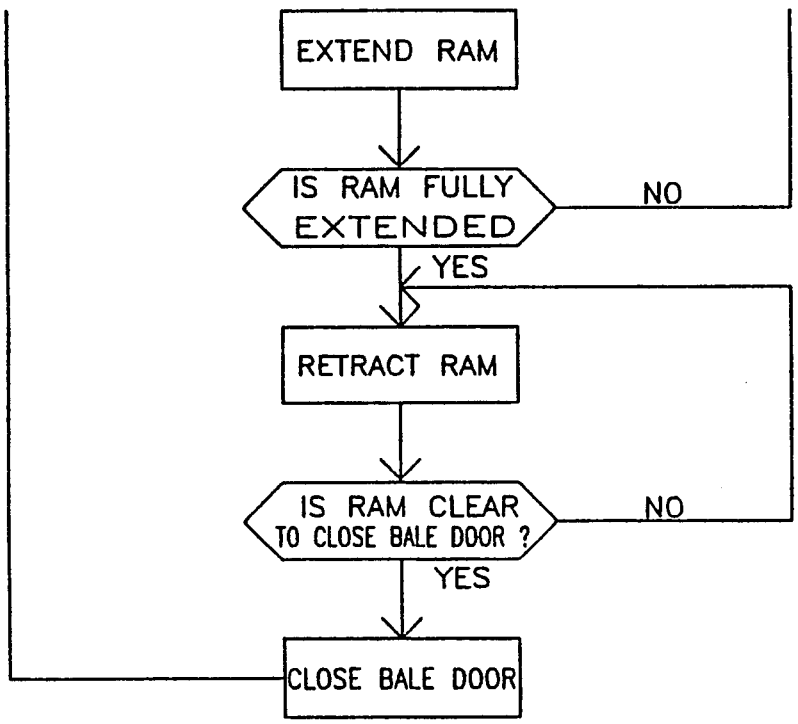
Figure 11A:
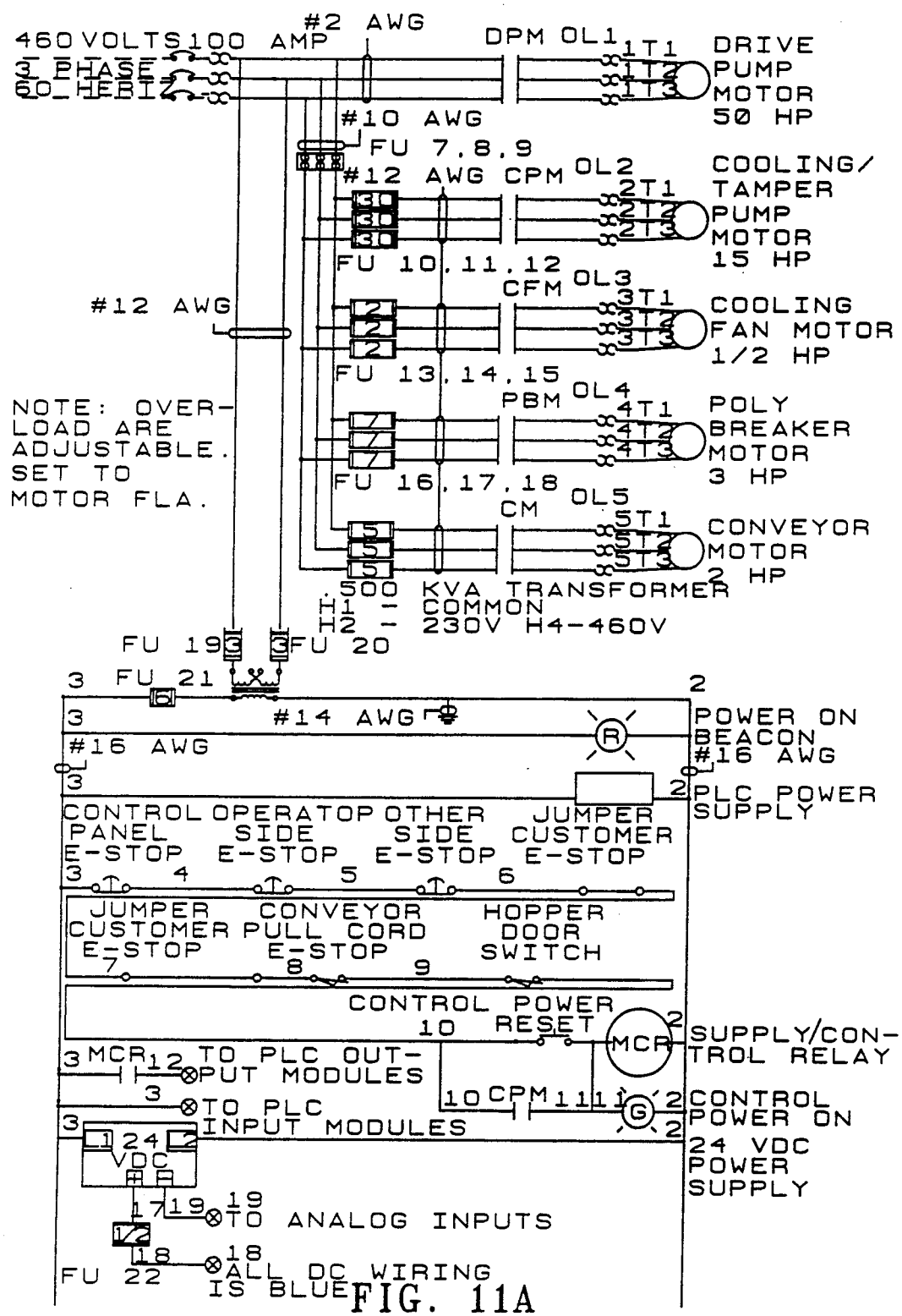
FIGS. 11A-11E illustrate the electromechanical circuit.
Figure 11B:
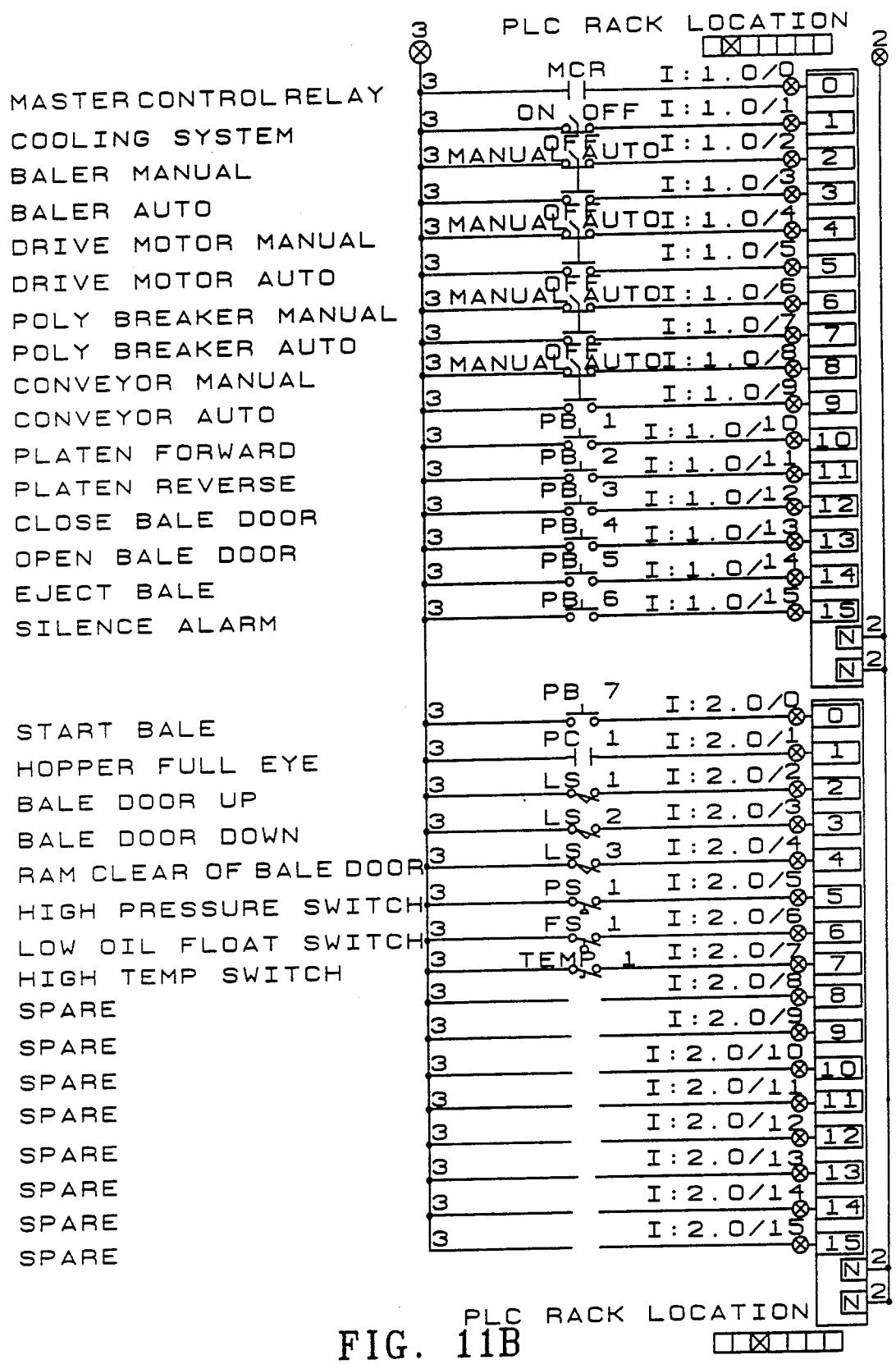
Figure 11C:
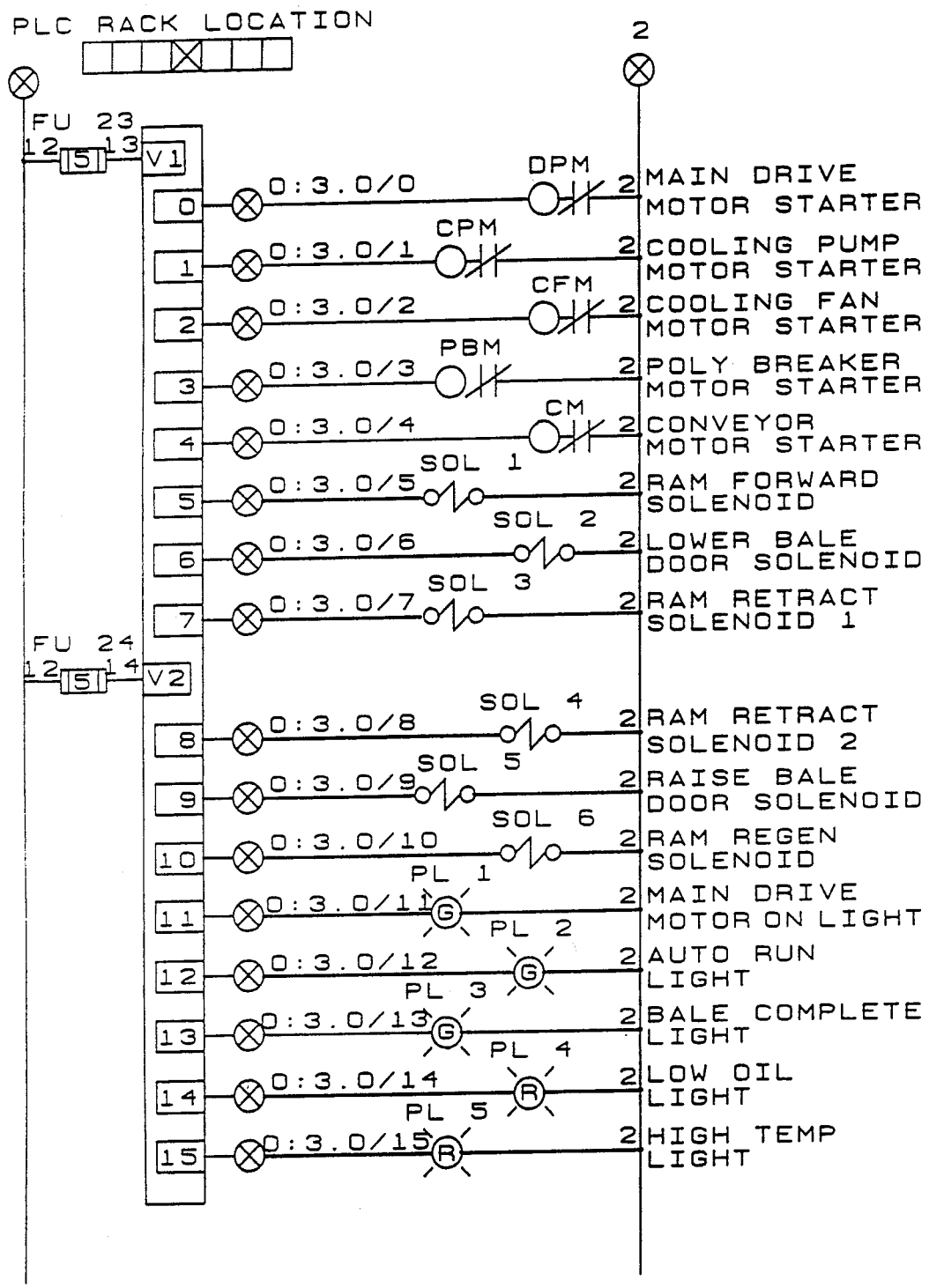
Figure 11D:
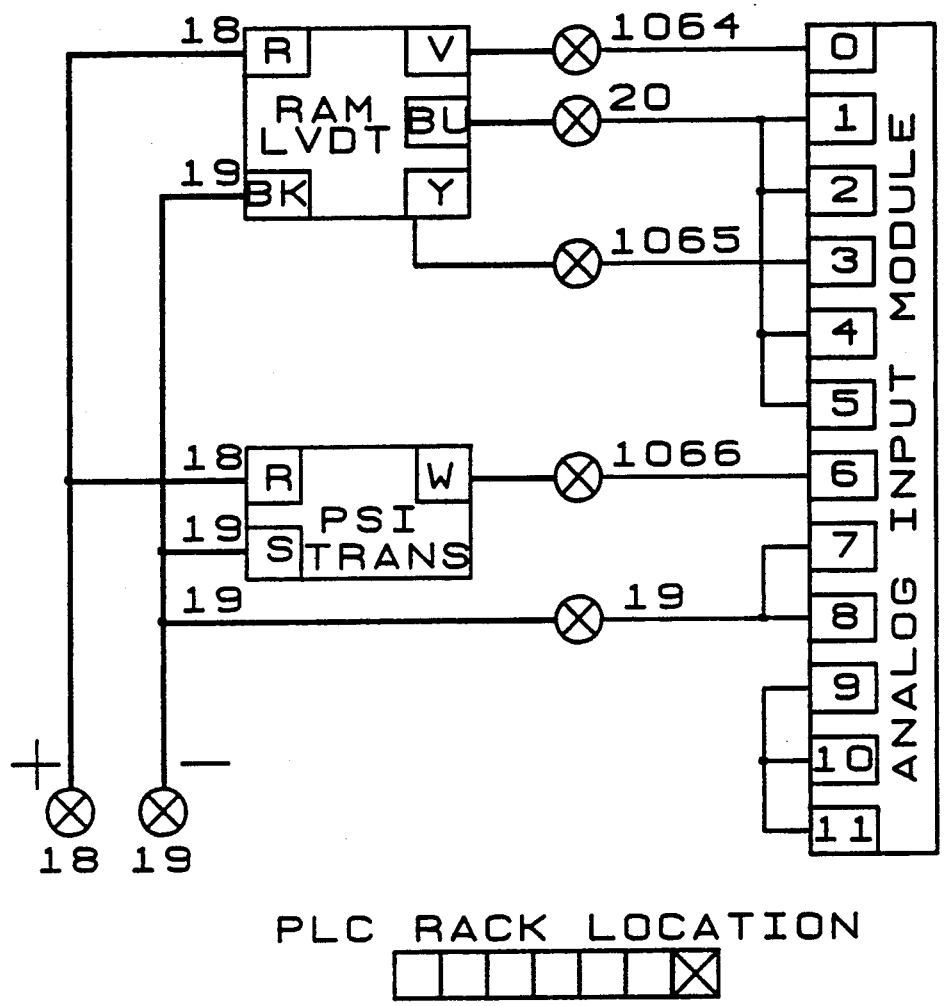
Figure 11E:
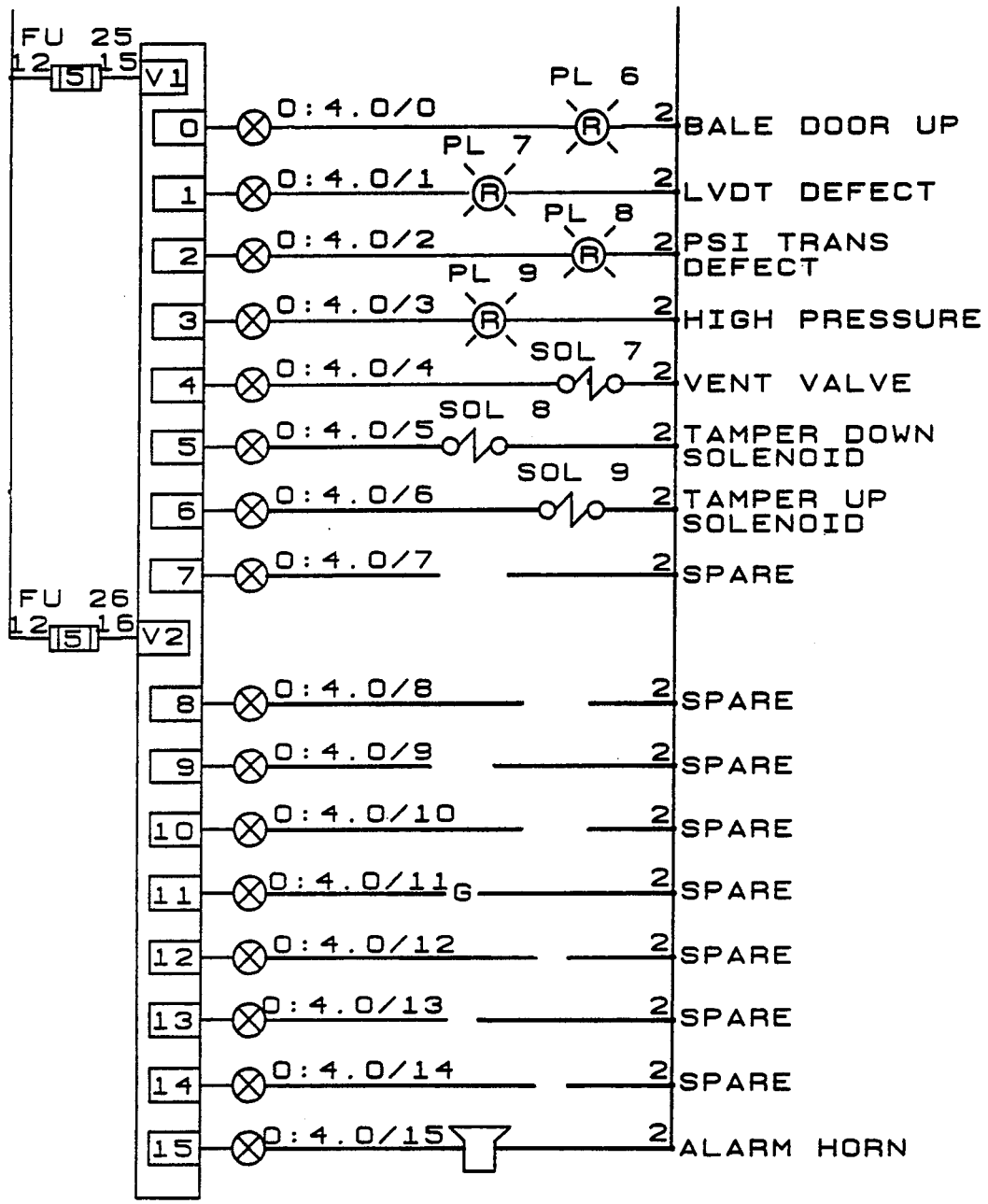
Figure 12A:
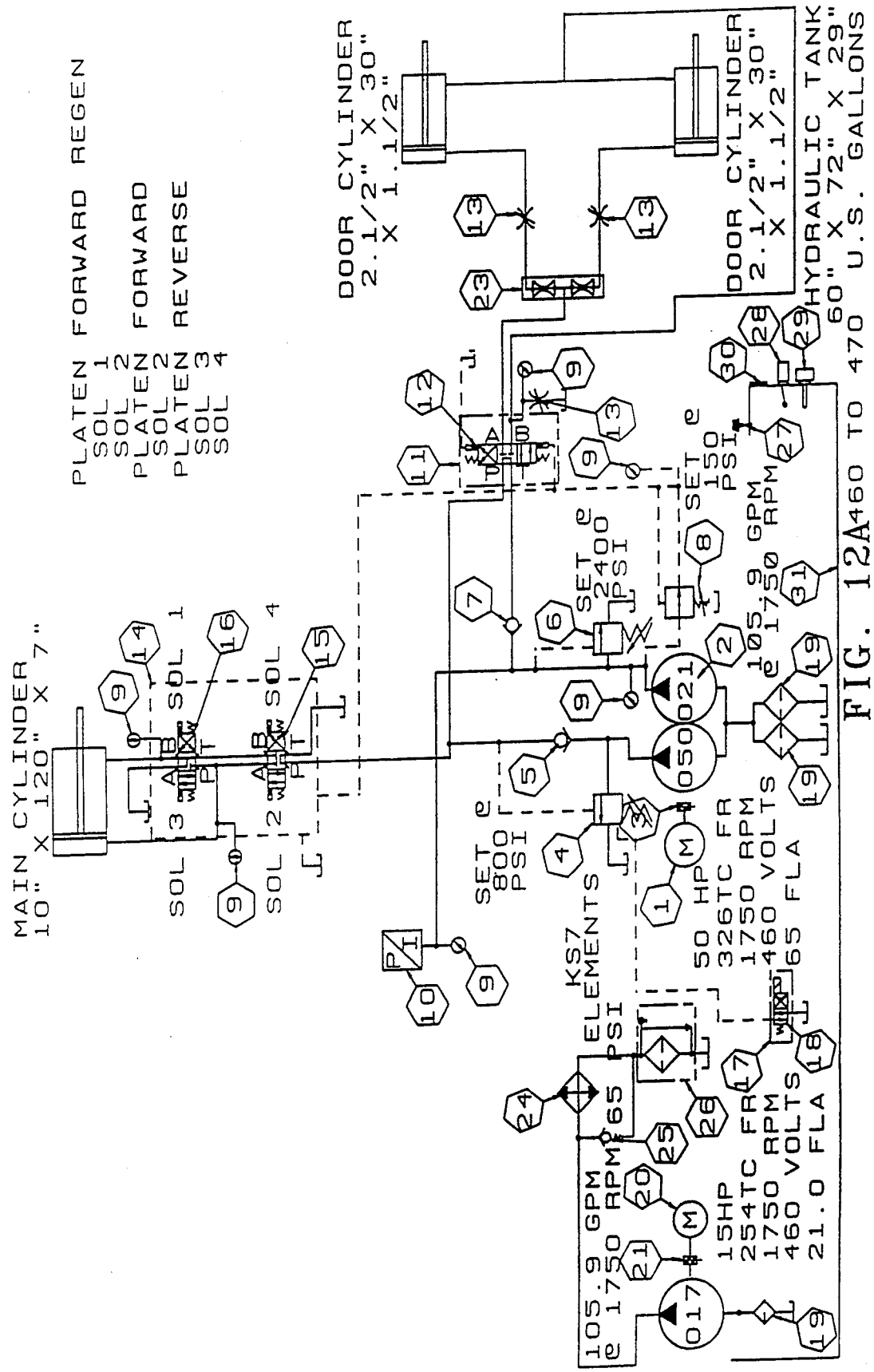

FIG. 9 illustrates the alignment of FIGS. 10A, 10B and 10C.

MODE OF OPERATION

FIGS. 10A, 10B and 10C illustrate a flow chart 200 for electromechanical operation of the polystyrene baler 10. Microfiche A Appendix 1 is the software program listing for the programmable logic controller.

FIGS. 11A, 11B, 11C, and 11D illustrate the electromechanical circuitry which is controlled by the software program of Appendix 1, which corresponds to the flow chart of FIGS. 1OA-10C to control the hydraulic circuitry, as well as the electromechanical circuitry for the polystyrene baler. The baler electromechanical circuitry, as well as hydraulics, senses the hydraulic system pressure, as well as the length of travel of the ram through a magnetostrictive linear displacement transducer (MLDT), which connects between the back side of the ram face plate and the end of the hydraulic cylinder. This indicates the distance of travel of the ram, as well as the velocity of travel of the ram. The distance of the travel of the ram is important because this indicates when compression is achieved on each stroke of the polystyrene against the ejection door, as well as the completion of a bale which is a predetermined distance of travel, and when that predetermined distance of travel is reached.

The polystyrene is essentially laminated to itself and baling is based on the function of the compression of each of the individual cells forming the polystyrene material. To obtain compression, it is necessary to compress the polystyrene sufficiently to break each of the individual cells of the polystyrene into a compressed form. It is desirable to obtain a high density bale for purposes of transporting the bales in an optimal form, such as by filling a rail cart to the desired maximum weight or a trailer of a tractor trailer to the desired maximum weight for purposes of transporting the bales for recycling so as to be within the economies of recycling, especially with respect to the transportation costs. One preferred bale size by way of example and for purposes of illustration only and not to be construed as limiting of the present invention, is a bale of about 54" in length by 43" in width, by 30" in height, in a range of about 500 pounds, although the bale could have any weight between 400 to 800 pounds depending upon the density of the bale. Preferably, the bale would have a density of about 10-20 pounds per cubic foot of baled polystyrene material. This is obtained by ram face pressure of 100 to 500 pounds per square inch, preferably about 200 pounds per square inch. The material to obtain optimum baling is chopped to a size of about 10" to 20", and preferably of a size of about 12". The polystyrene usually is molded into much larger sizes, such as for packing material for appliances or manufacturing parts; and therefore, needs to be chopped prior to compression. There are also different grades of polystyrene, and the different grades will bale under pressure depending upon the response of the material to the ram face plate pressure. It may be necessary to hold the polystyrene under pressure, although this reduces the throughput of the baling. It is important to compress and take away at least 90% of the memory of the polystyrene, and to break the cells for intensification under compression, in what may be referred to as laminating.

Polystyrene, such as packing materials, boxes or beads, are dumped into the hopper, some of which may fall through or between the chopper legs of the polystyrene baler enclosure. The large chunks are reduced to pieces, having a maximum dimension of 12". The ram is repeatedly extended to compact the material, and the length of movement of the ram, and the pressure exerted by the ram are controlled through algorithms stored in a microprocessor in the electromechanical control circuitry. Once a bale is formed, the bale can be tied off which is optimal, the door is opened and the ram pushes the bale out the end of the baler and past the door.

The compression stroke is at maximum pressure to complete each baling cycle. The compression stroke at maximum pressure is repeated until the bale is complete, based upon the length of the bale, as well as the pressure of the hydraulic fluid in the hydraulic circuit for the ram.

DESCRIPTION OF THE FIRST ALTERNATIVE EMBODIMENT

Figure 13:
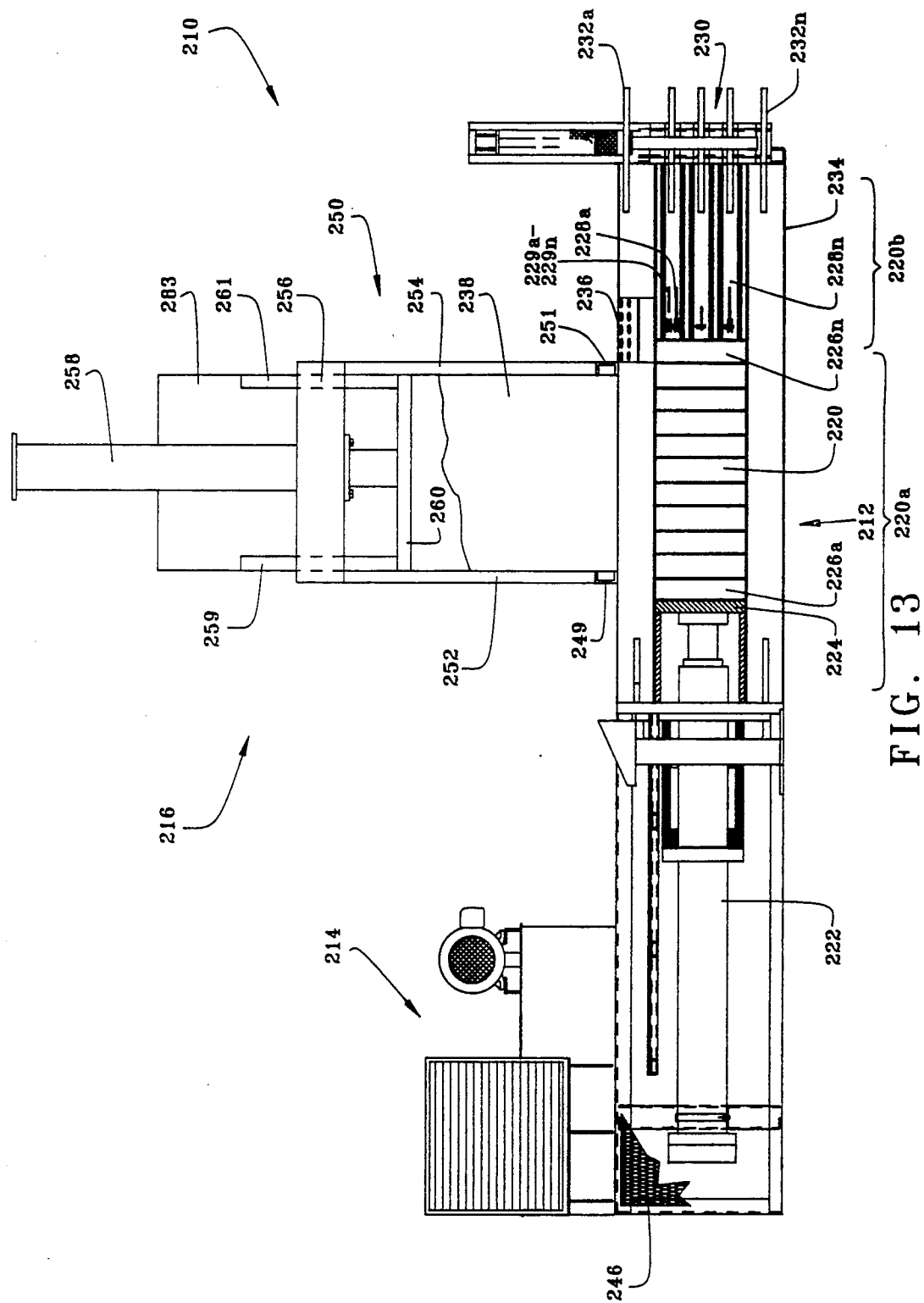
FIG. 13, a first alternative embodiment, illustrates a side view in partial cross section and cutaway view of a polystyrene baler.
Figure 14:
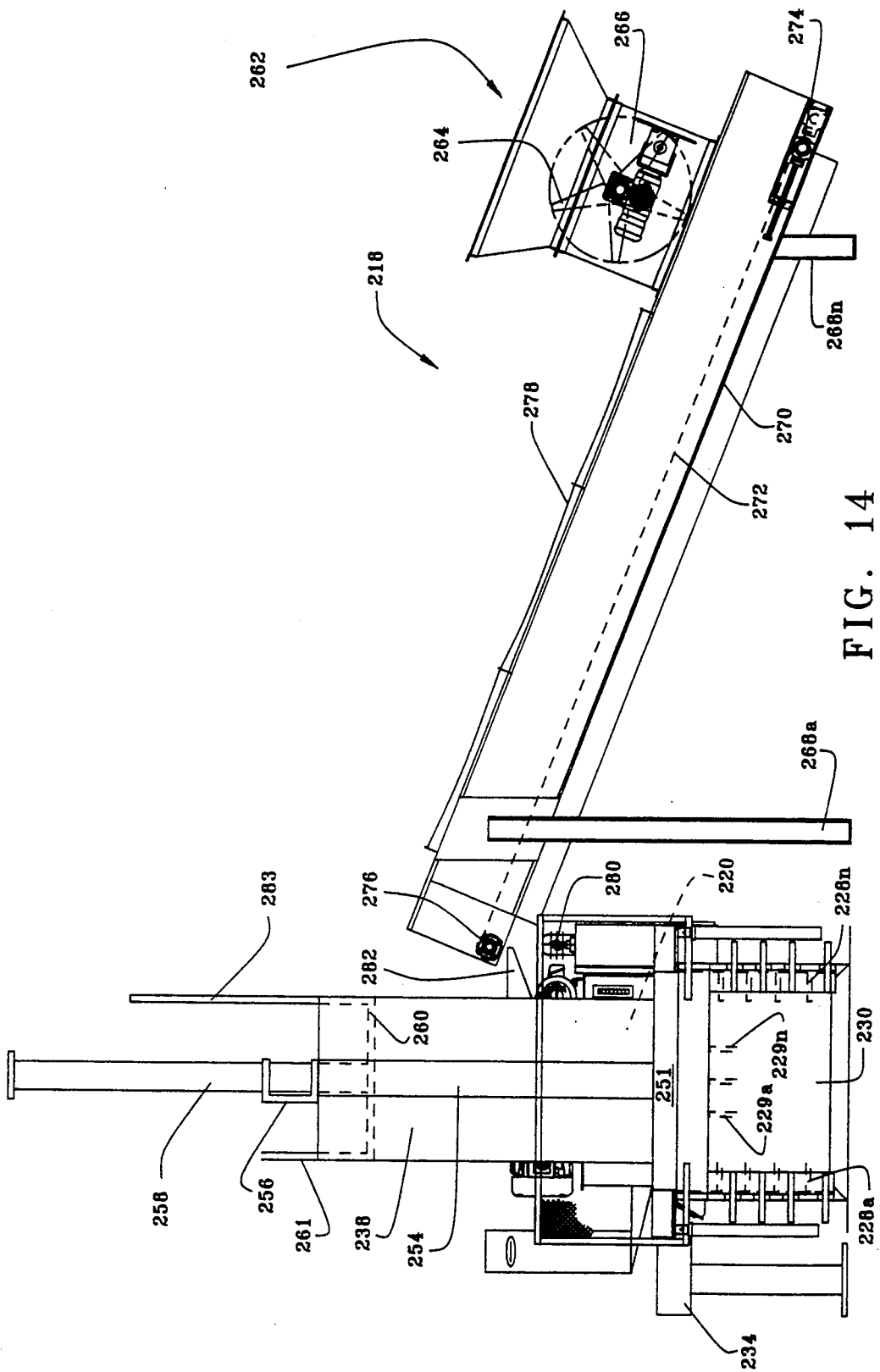
FIG. 14 illustrates a side view of the polystyrene baler.
Figure 15:
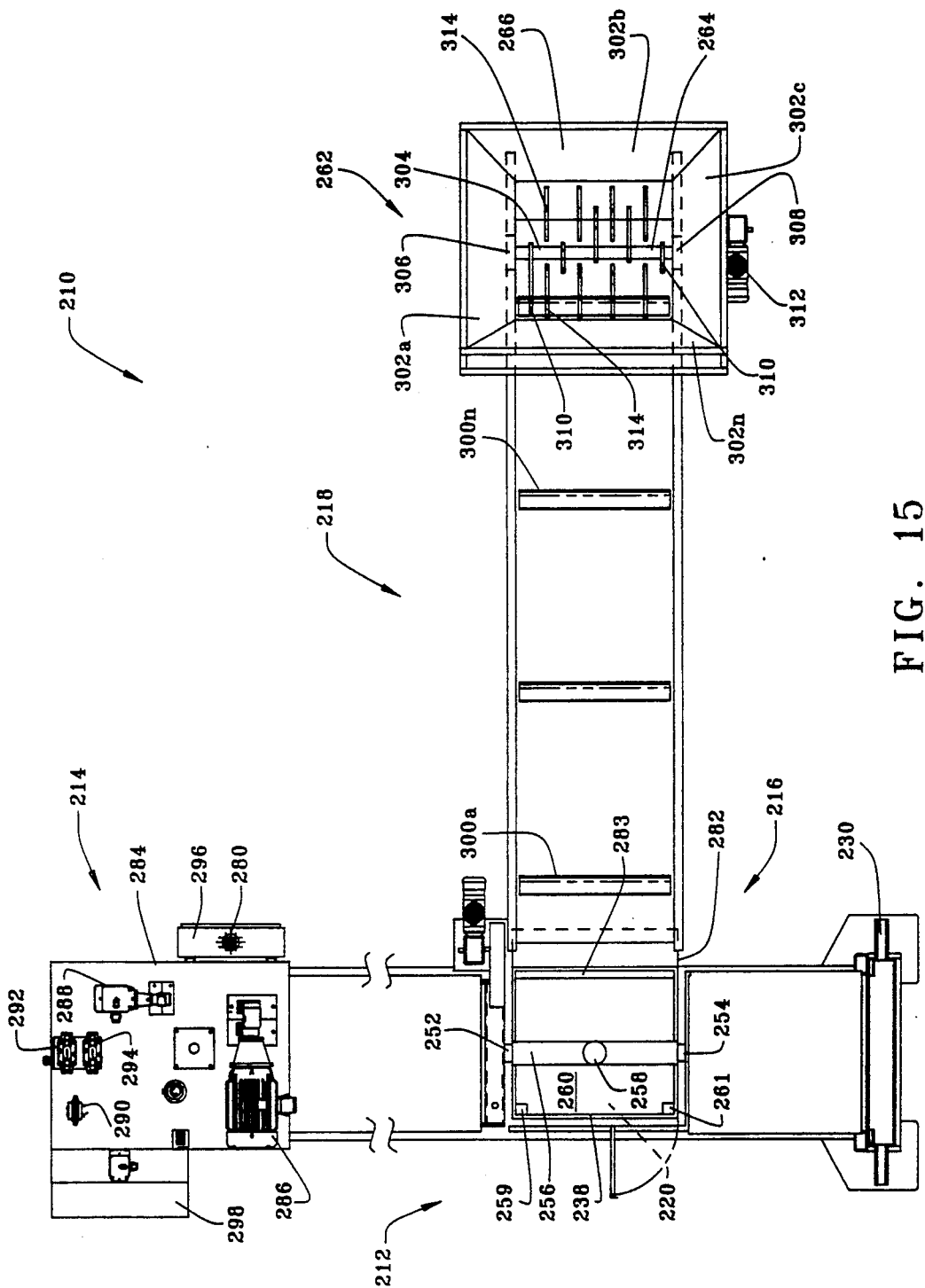
FIG. 15 illustrates a top view of the polystyrene breaker.

FIG. 13, a first alternative embodiment, illustrates a side view in partial cross section and cutaway of a polystyrene baler 210, the present invention, generally including a baler 212, a hydraulic power unit 214, a charging box 216 and a loading conveyor 218 illustrated in FIGS. 14 and 15. Polystyrene material to be baled is moved upon the conveyor 218 into the charging box 216, and is baled in the compression box 220 integral to the baler 212.

The baler 212, shown in cutaway view, includes a large hydraulic cylinder 222, a ram 224 aligned in the compression box 220 and secured to the hydraulic cylinder 222, a plurality of channels 226a-226n lining portion 220a of the compression box 220, a plurality of horizontal retaining dogs 228a-228n, includes four retaining dogs on each side of the compression box 220 and an array of 3—3 vertical retaining dogs 229a-229n viewed in FIG. 14, in portion 220b of the compression box 220, a vertically operated bale door 230, a plurality of reinforcement bars 232a-232n about the bale door 230 and a baler framework 234. A control panel 236 positions on the other side of the baler framework 234.

The charging box 216 includes a tamper box 238 aligned generally over the portion 20a of the charging box 220. A protective screen 246 aligns over the left end of the baler framework 234.

A tamper box 238 aligns over and above the charging box portion 220a of the compression box 220 to press or tamp chopped polystyrene into the charging box portion 220a, and includes opposing vertical channels 252 and 254. Horizontally aligned channels 249 and 251 support the vertically aligned channels 252 and 254. A horizontally aligned channel member 256 secures across the upper portions of the vertical channels 252 and 254. A hydraulic cylinder 258 secures to the horizontal channel member 256 and a tamper platen 260 secures to the hydraulic cylinder 258. A vertically aligned vertical tamper plate 283 secures to the front of the tamper platen 260, and two polymer faced and vertically aligned right angle guides 259 and 261 secure to the rear ends of the tamper platen 260.

FIG. 14 illustrates a side view of the polystyrene baler 210 including a polystyrene breaker 262 where all numerals correspond to those elements previously described. The polystyrene breaker 262 is essentially of the same design as the polystyrene breaker 40 illustrated in FIGS. 6, 7, and 8 and includes similar and like members. The polystyrene breaker 262 mounts on one end of the loading conveyor 218. A rotary chopper 264, which is an integral part of the polystyrene breaker 262 aligns in the polystyrene breaker enclosure 266 and is described later in detail. Also illustrated is the conveyor 218 including a plurality of legs 268a-268n supporting a framework 270. The conveyor 218 includes a powered belt 272 which aligns about opposing axles 274 and 276. A safety shut off wire 278 extends along both sides of the conveyor 218 to stop the conveyor 218 if an undesirable operating condition exists. A light 280 signals operation of the polystyrene baler 210 to warn personnel of system activation.

The loading conveyor 218 conveys chopped polystyrene from the polystyrene breaker 262 and deposits it in a loading chute 282 extending from the side of the tamper box 238 which also acts as a hopper to the charging box 238. Once the chopped polystyrene is loaded into the hopper, the vertical tamper plate 260 can be hydraulically actuated to precompress the material in the charging box portion 220a. The ram 224 of FIG. 13 is then actuated subsequently for compression in the compression chamber 220 to form the bale. A planar front baffle 283 is also included to assist in loading of chopped polystyrene, as well as closing off the compression box 220 during a tamping operation where materials precompressed in the hopper in a pressing action. Tamping can occur preferably towards the end of the process for baling the end of the bale, but can also be used at any time during the baling process.

FIG. 15 illustrates a top view of the polystyrene baler 210 where all numerals correspond to those elements previously described. The hydraulic power unit 214 includes a hydraulic component mounting structure 284, hydraulic pumps 286 and 288, control valves 290, 292 and 294, and other assorted hydraulic devices. Also included is an electrical control panel 296 and an air-to-oil cooler 298. Also illustrated on the conveyor 218 are a plurality of cleats 300a-300n.

The polystyrene breaker 262 is similar to the polystyrene breaker 40 of the previous figures. The polystyrene breaker enclosure 266 includes a plurality of sides 302a-302n. The rotary chopper 264 includes a main shaft 304 rotationally secured to opposing bearings 306 and 308 on the lower sides 302a and 302c of the polystyrene breaker enclosure 266. A plurality of like chopper arms 310 are offset from each other about the main shaft 304 in the same fashion as illustrated in FIGS. 7 and 8. A motor 312 and appropriate sprockets on the motor 312 drives the chopper main shaft 304. Illustrated in particular is the intermeshing of the rotary chopper arms 310 with the like stationary chopping arms 314 extending from opposing sides 302b and 302n of the polystyrene breaker enclosure 266.

Incoming polystyrene material is introduced into the top of the polystyrene breaker 262 and is broken up and crushed between the interleaved rotary chopper arms 310 and the stationary chopping arms 314 to be gravitationally deposited on the underlying conveyor 218 and subsequently into the vertical tamper box 250 and the compression box 220 where it is compressed and baled.

The top of the tamper is illustrated, including the tamper platen 260, the front baffle 283, the hydraulic cylinder 258, and the rear end right angle supports 259 and 261 within the tamper box 238, which fits over the charging box 220 of the baler. The tamper plate 260 has a rectangular dimension of about 30"×50", which corresponds to the size of a compressed bale.

Figure 16:
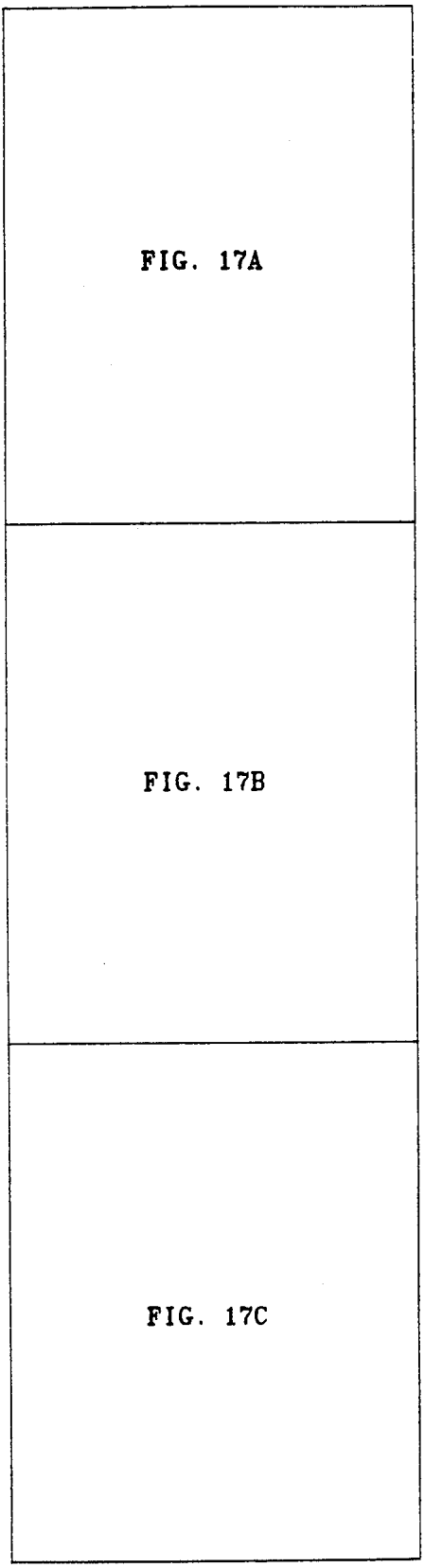
FIG. 16 illustrates the alignment of FIGS. 17A-17C.
Figure 17A:
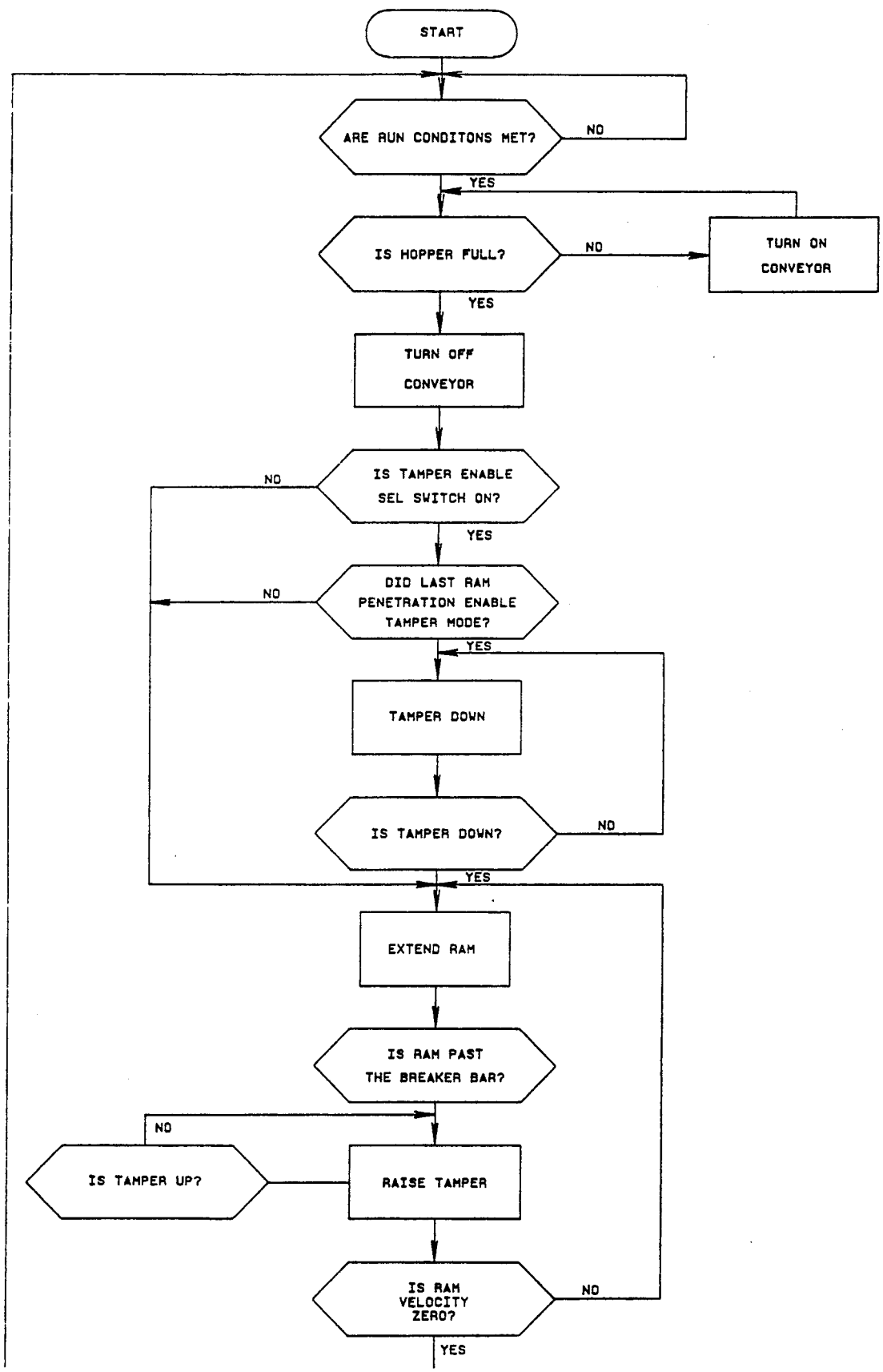
FIGS. 17A-17C illustrate flow charts for electromechanical operation of the polystyrene baler.
Figure 17B:
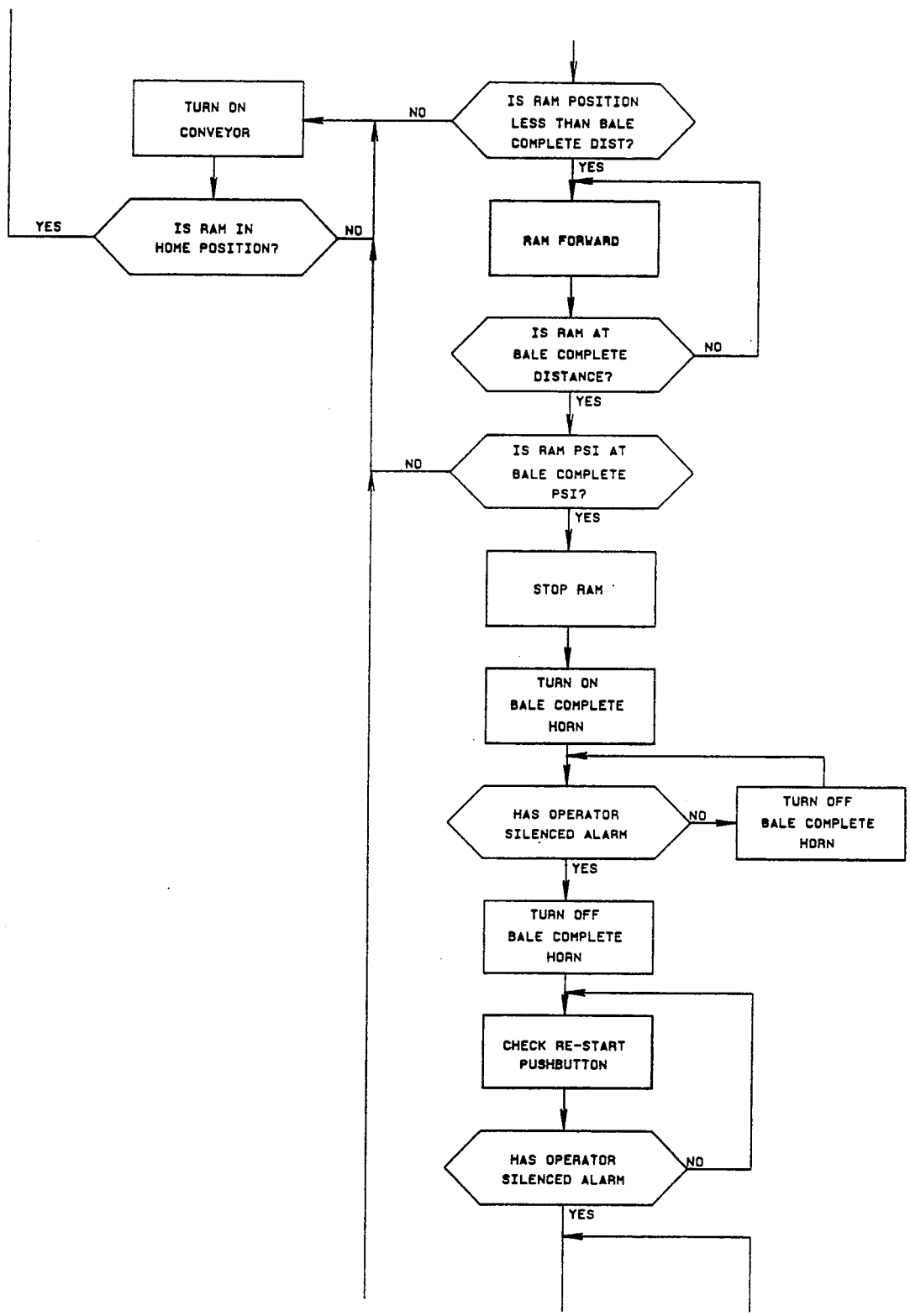
Figure 17C:
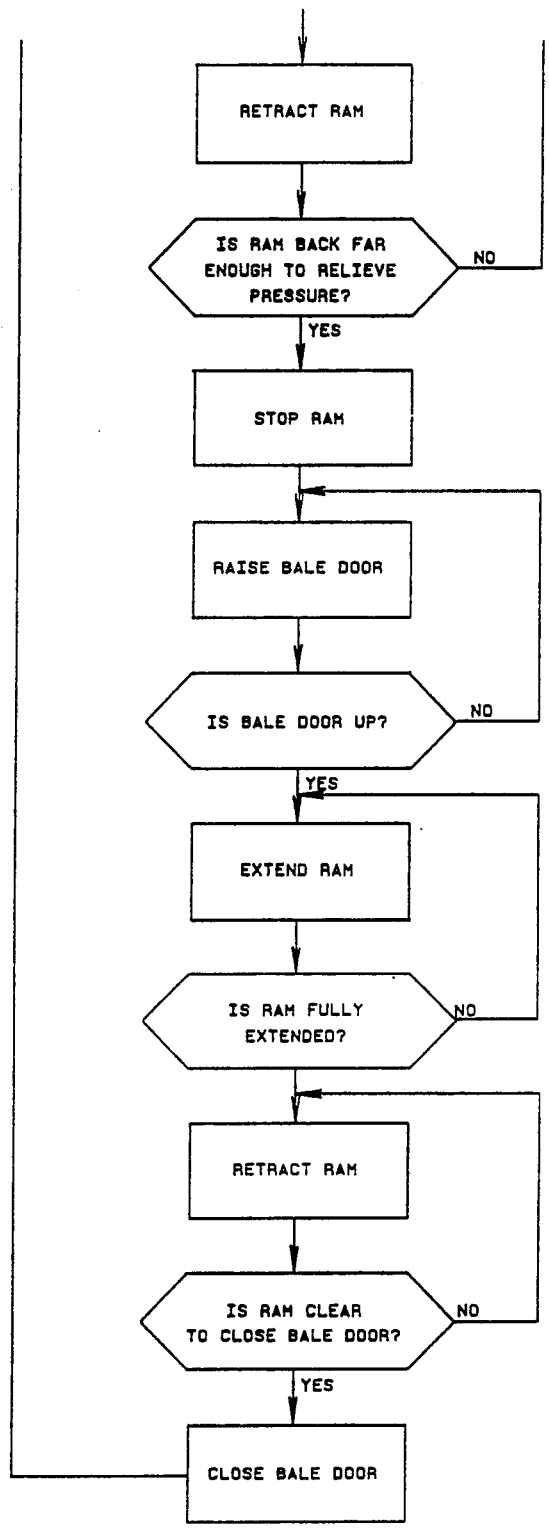
Figure 18A:
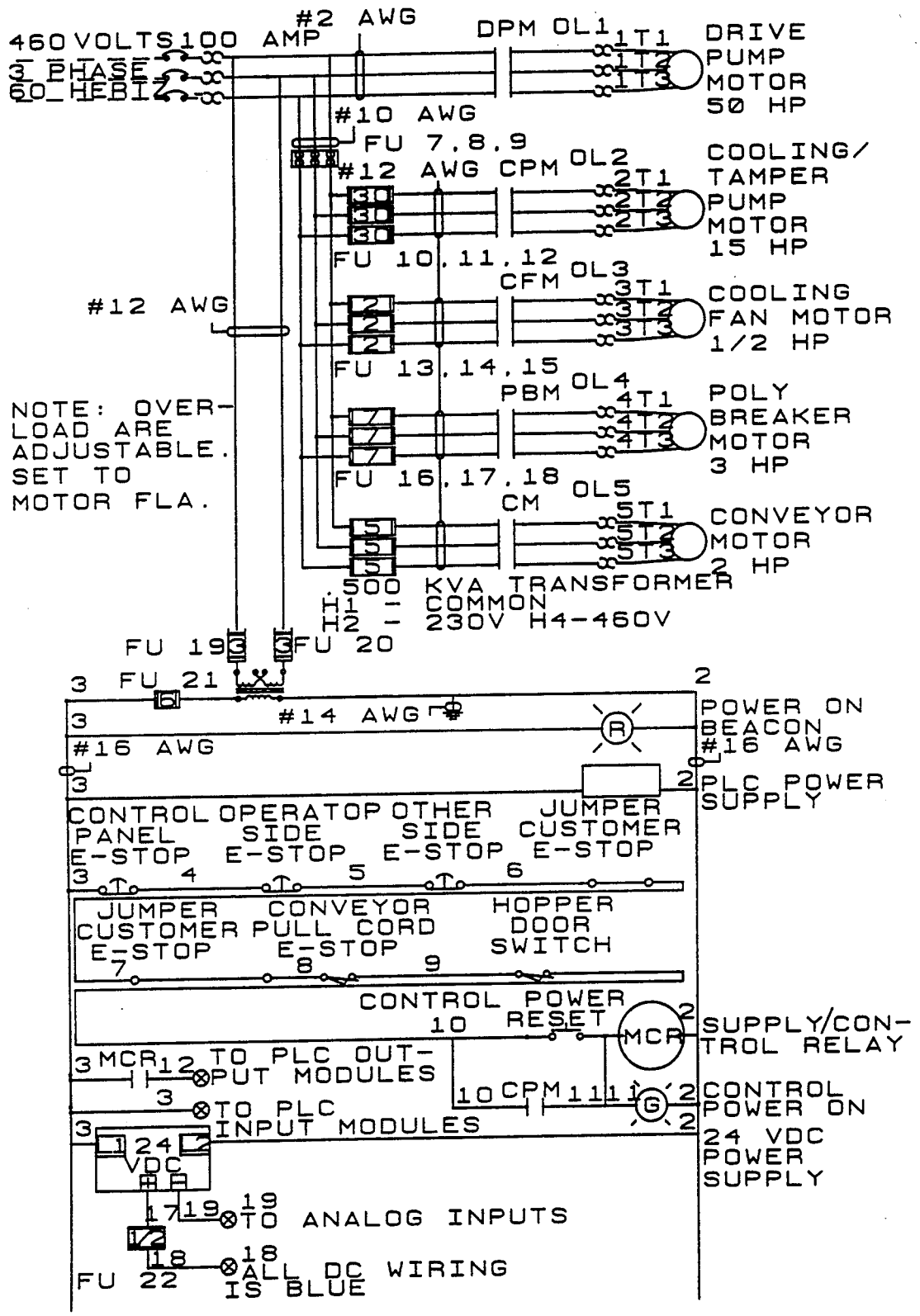
Figure 18C:
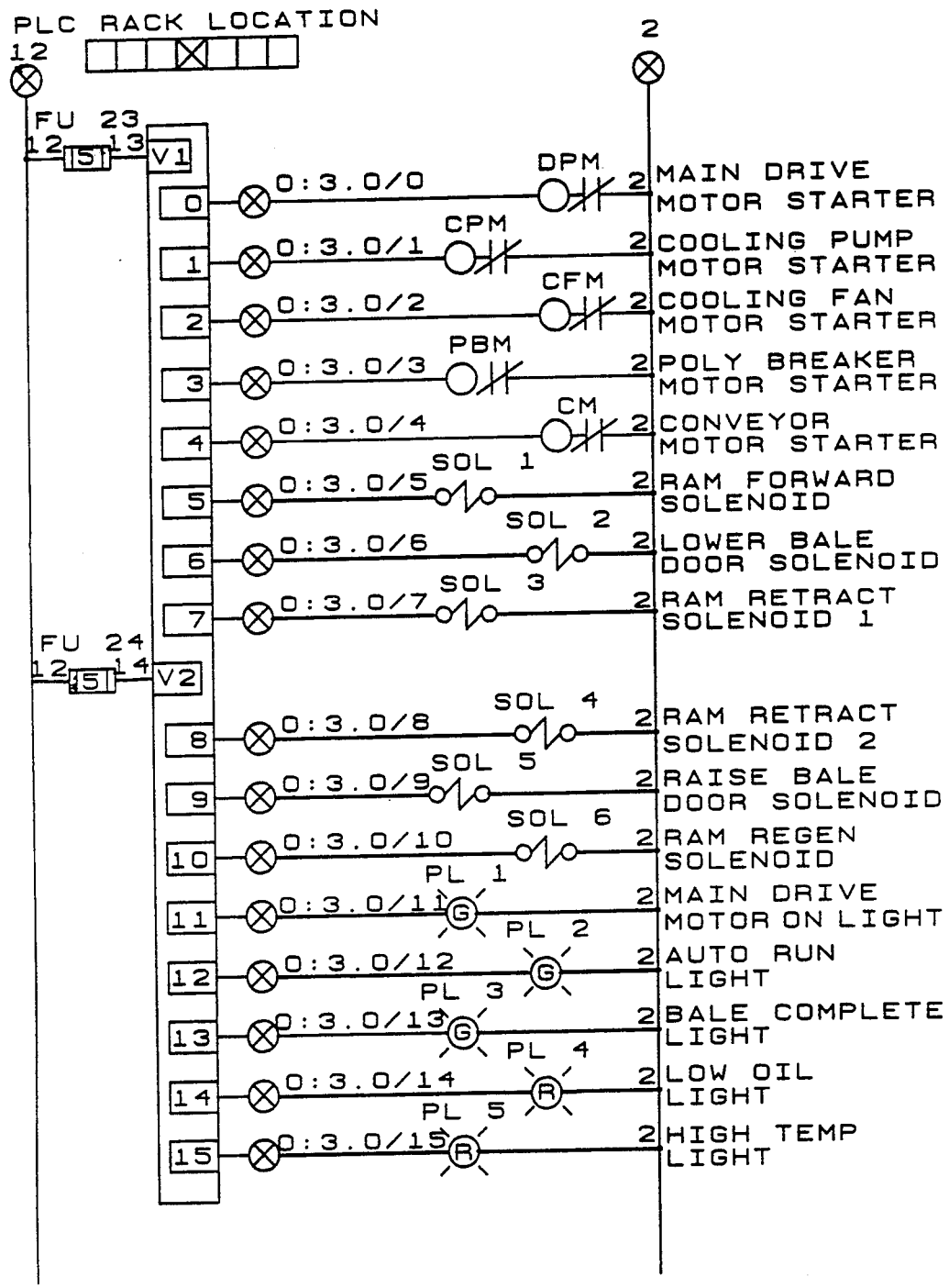
Figure 18D:
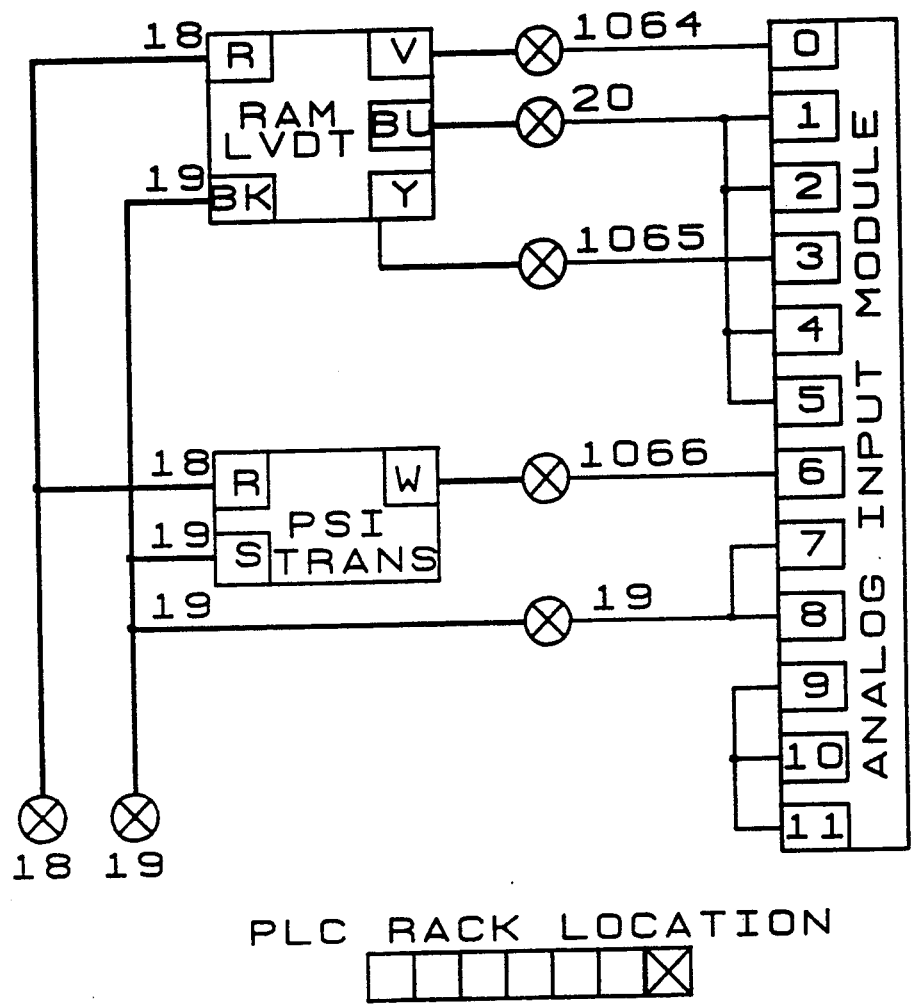
Figure 18E:
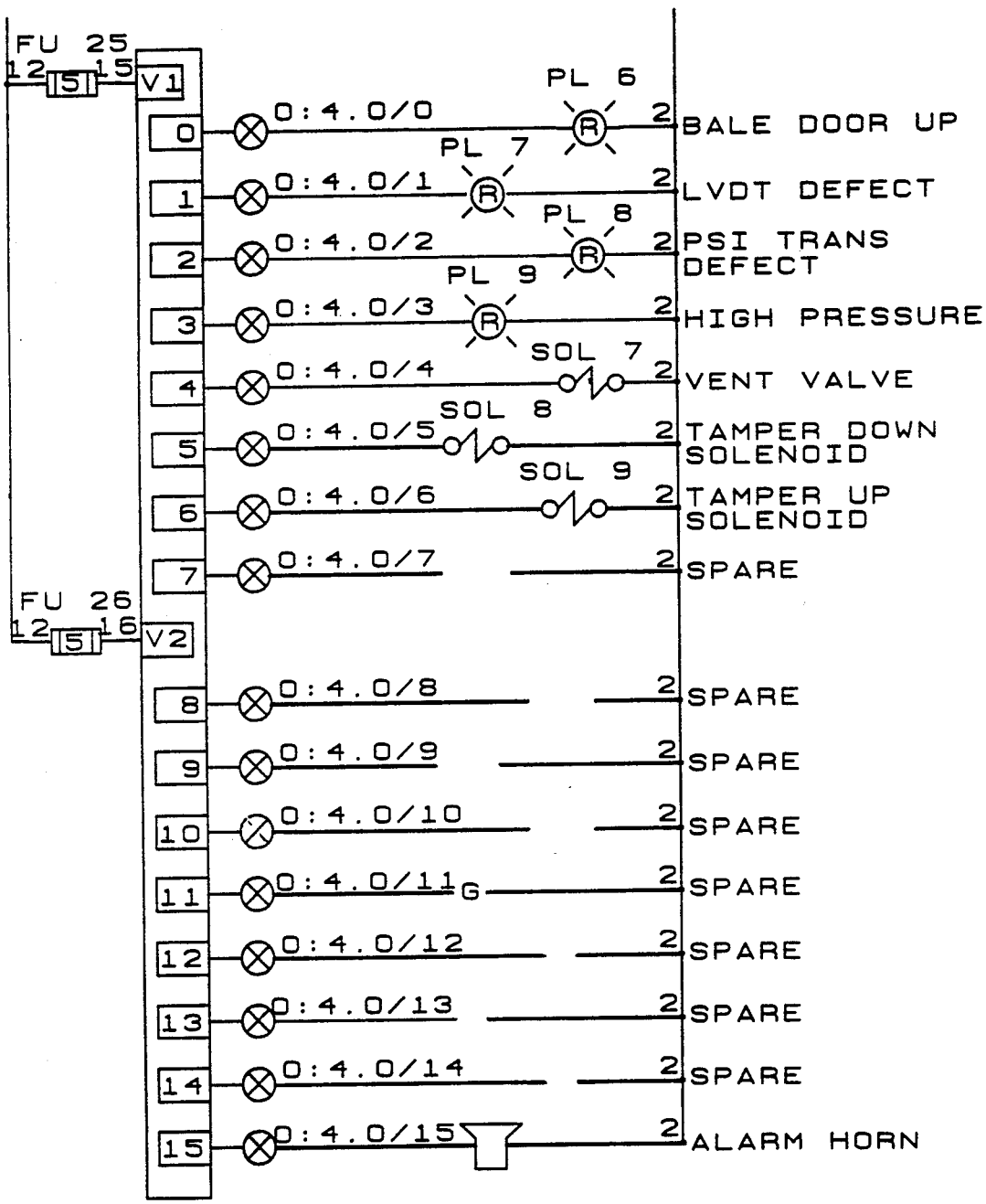

FIG. 16 illustrates the alignment of FIGS. 17A–17C.

MODE OF OPERATION OF THE FIRST ALTERNATIVE EMBODIMENT

FIGS. 17A–17C illustrate a flow chart 400 for elctromechanical operation of the polystyrene baler 10. Microfiche Appendix 2 is the software program listing for the programmable logic controller for the first alternative embodiment.

Figure 19A:
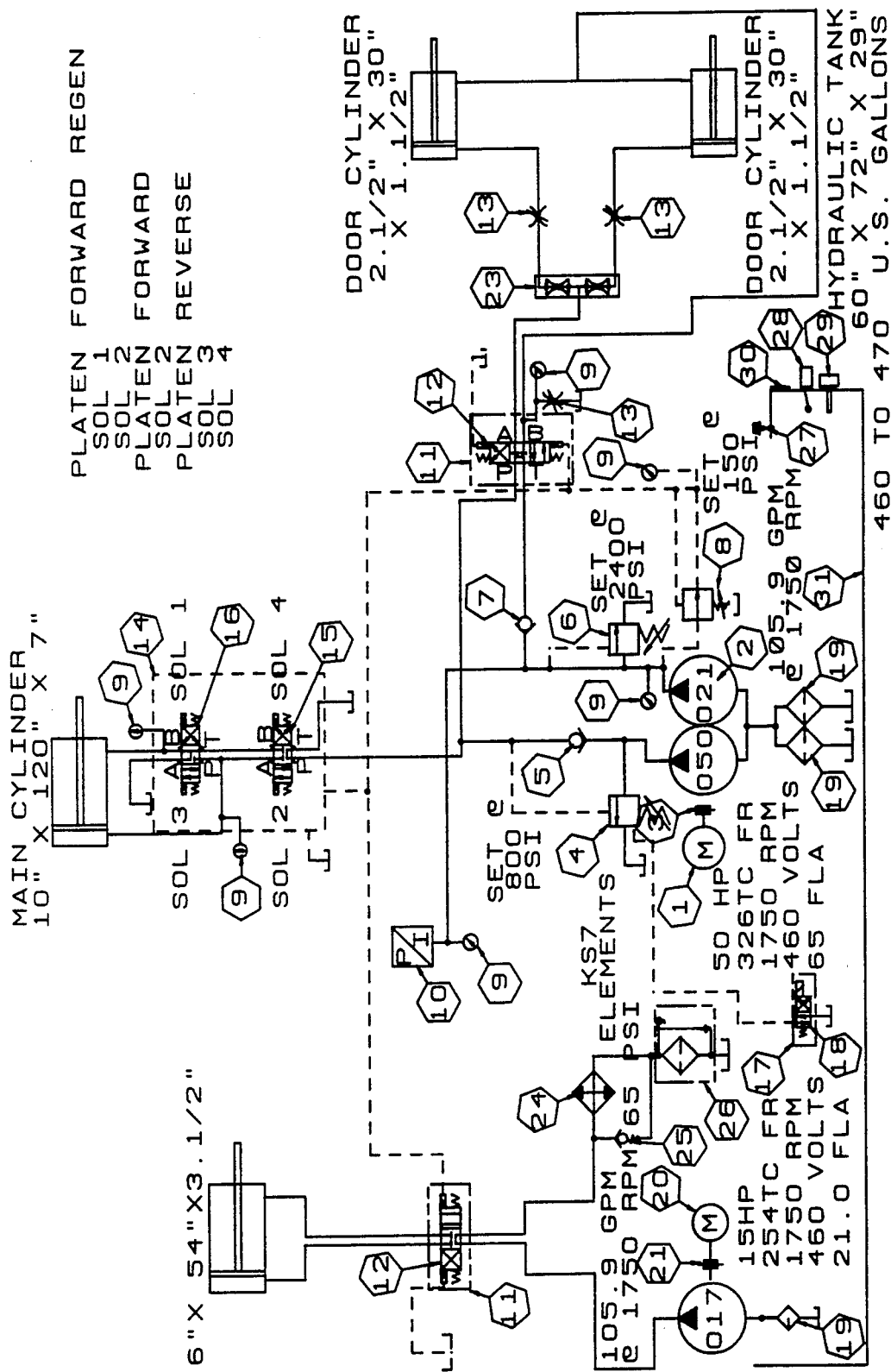

FIGS. 18A, 18B, 18C, and 18D illustrate the electromechanical circuitry which is controlled by the software program of Appendix 2, which corresponds to the flow chart of FIGS. 17A–17C to control the hydraulic circuitry of FIG. 19, as well as the electromechanical circuitry for the polystyrene baler. The baler electromechanical circuitry, as well as hydraulics, senses the hydraulic system pressure, as well as the length of travel of the ram through a magnetostrictive linear displacement transducer (MLDT), which connects between the back side of the ram face plate and the end of the hydraulic cylinder. This indicates the distance of travel of the ram, as well as the velocity of travel of the ram. The distance of the travel of the ram is important because this indicates when compression is achieved on each stroke of the polystyrene against the ejection door, as well as the completion of a bale which is a predetermined distance of travel, and when that predetermined distance of travel is reached. The distance of travel of the ram in the compression chamber determines when the tamper is engaged in operation. By way of example and for purposes of illustration only and not to be construed as limiting of the present invention, when the ram travels the distance of 112" to 72", the tamper operates when the ram travels the distances of 84" to 72". The tamper provides a dual function of compressing material from the upper hopper down into the charging box, which is before and prior to the compression chamber, and also keeps material from being forced upwards during compression, as the tamper plate essentially acts as a door, keeping material in the lower area about the ram. While it is illustrated that the tamper travels to the top of the ram, the tamper can also travel to the base of the baler, providing for additional tampering and compression of the materials. The length of travel of the tamper is controlled by limit switches.

The polystyrene is essentially laminated to itself and baling is based on the function of the compression of each of the individual cells forming the polystyrene material. To obtain compression, it is necessary to compress the polystyrene sufficiently to break each of the individual cells of the polystyrene into a compressed form. It is desirable to obtain a high density bale for purposes of transporting the bales in an optimal form, such as by filling a rail car to the desired maximum weight or a trailer of a tractor trailer to the desired maximum weight for purposes of transporting the bales for recycling so as to be within the economies of recycling, especially with respect to the transportation costs. Another preferred bale size by way of example and for purposes of illustration only and not to be construed as limiting of the present invention, is a bale of about 56" in length by 30" in width, by 26" in height, in a range of preferably about 500 pounds, although the bale could be of any weight between 300 to 800 pounds depending upon the density of the bale. Preferably, the bale would have a density of about 10–20 pounds per cubic foot of baled polystyrene material. This is obtained by ram face pressure of 100 to 500 pounds per square inch, preferably in a range of about 180–280 pounds per square inch. The material to obtain optimum baling is chopped to a size of about 10" to 20", and preferably of a size of about 12". The polystyrene usually is molded into much larger sizes, such as for packing material for appliances or manufacturing parts; and therefore, needs to be chopped into smaller sizes prior to compression. There are also different grades of polystyrene, and the different grades will bale under different pressures depending upon the response of the material to the ram face plate pressure. It may be necessary to hold the polystyrene under pressure for a predetermined time period, although this reduces the throughput of the baling. It is important to compress and take away at least 90% of the memory of the polystyrene, and to break the cells for intensification under compression, in what may be referred to as laminating of the broken cell structures together.

Polystyrene, such as packing materials, food trays, boxes, beads, etc. are dumped into the chopper, some of which may fall through or between the chopper legs of the polystyrene baler enclosure. The large pieces are reduced to smaller pieces, having a maximum dimension of 12". The smaller pieces are then conveyed to the hopper.

The ram is repeatedly extended to compact the material, and the length of movement of the ram, and the pressure exerted by the ram are controlled through algorithms stored in a microprocessor in the electromechanical control circuitry. The tamper is utilized to complete about the last 12 inches, by way of example and for purposes of illustration only and not to be construed as limiting of the present invention, of the bale in one mode of operation by coming down to the top of the ram above the charging box. Once a bale is formed, the bale can be optionally tied off, the door opened, and the ram actuated to push the bale out the end of the baler and past the door.

The compression stroke is at maximum pressure to complete each baling cycle. The compression stroke at maximum pressure is repeated until the bale is complete, based upon the length of the bale, as well as the pressure of the hydraulic fluid in the hydraulic circuit for the ram. One desired bale length is 56".

FIG. 19 illustrates the hydraulic schematic.

Figure 20:
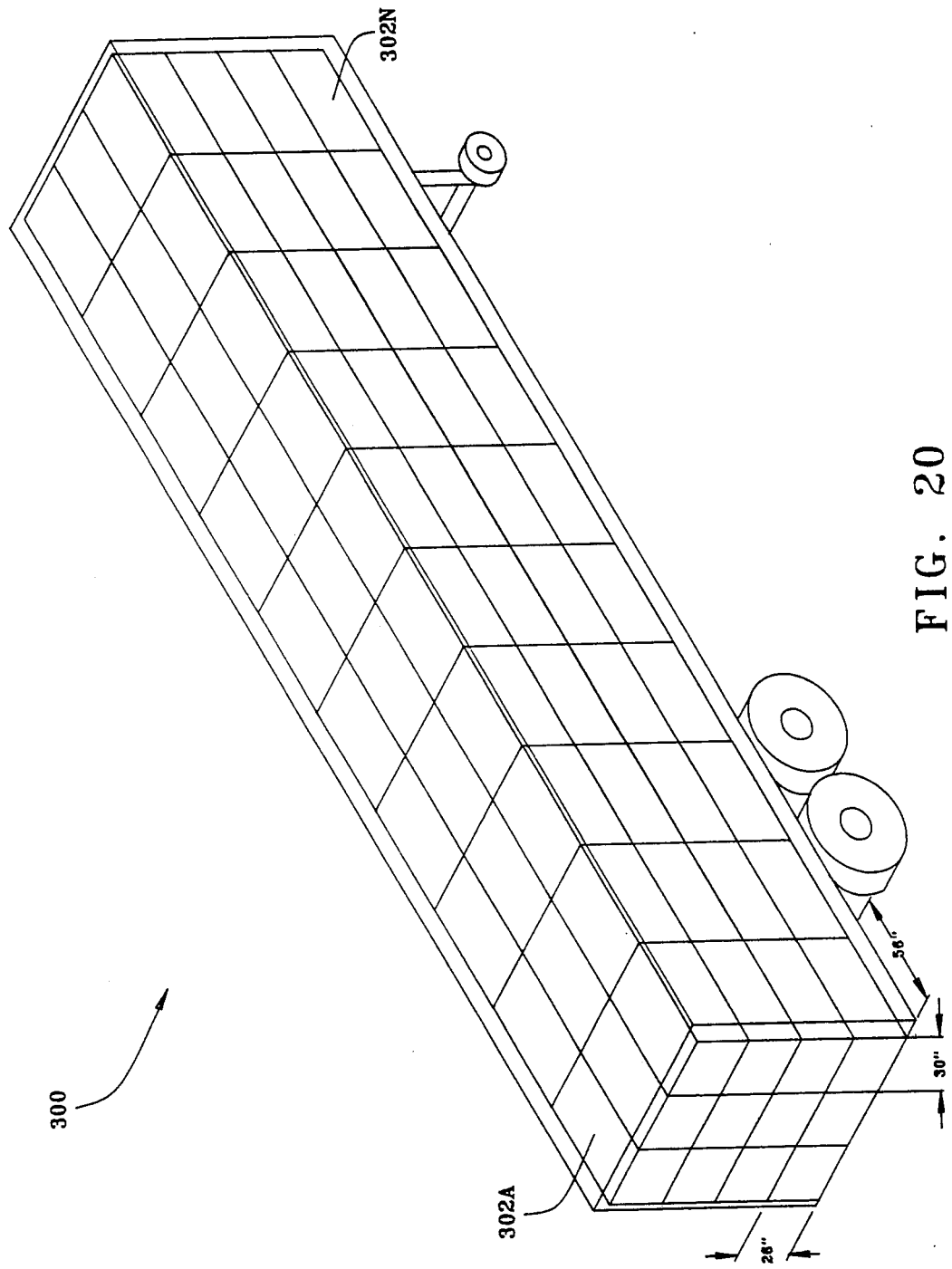
FIG. 20 illustrates bales loading in a hi-cube trailer.

FIG. 20 illustrates a hi-cube trailer 300 loaded with a plurality of compressed polystyrene bales 302a–302n. A finished bale measures about 26' high×30" wide ×56" long is compressed in a baling chamber, whose dimensions are about 80" in length, 30" in width and 26" in height by way of example and for purposes of illustration only and not to be construed as limiting of the present invention. The density of a bale depends upon the overall platen force applied to the bale in the baling chamber. This platen force varies with the size of the main cylinder base. An 8" cylinder base ram produces a platen face pressure of 180 PSI for an overall platen force of 140,400 lbs. to produce a bale weight of up to about 280 lbs. 120 bales can be conventionally and efficiently stacked as illustrated in a 48 foot hi-cube trailer, and will weigh just less than 34,000 lbs. In the alternative, a loll bore ram produces a platen face pressure of 281 PSI for an overall platen force of 219,180 lbs. to produce a bale weight of up to 365 lbs. 120 bales can be conveniently and efficiently stacked in a 48-foot hi-cube trailer of dimensions 98" wide by 110" high by 570" long, and will weight just less than 44,000 lbs. It can be seen that bale weight can be bales for an appropriate weight and density to meet motor carrier or highway weight restrictions as desired.

This figure illustrates the most efficient manner and method of loading and stacking of baled material into a hi-cube trailer, whose inside dimensions are about 110" high×98" wide ×570" long. Preferably stacking is three wide by four high along the length of the trailer. Bale size and trailer sizes may slightly vary.

Various modifications can be made to the present invention without departing from the apparent scope hereof.

We claim:

1. A process for baling low density foam material having internal cells comprising the steps of:
    a. loading foam material having cells into a hopper above a charging box of a baler;
    b. dropping the foam material into the charging box from the hopper;
    d. providing at least one compression stroke by a ram to compress the foam material from the charging box with sufficient force to break each cell;
    d. repeating steps a–c until determining that a predetermined bale size of the foam material has been achieved; and,
    e. providing a compression stroke at maximum pressure to compress the foam material.

2. The process of claim 1 further comprising the step of tamping said material in the hopper to precompress the foam material prior to balling.

3. A baling system for baling foam having internal cells comprising:
    a. a longitudinal baler with a door at one end and a ram means at the other end for baling foam;
    b. said longitudinal baler including a compression chamber adjacent said door and a charging box adjacent said ram means;
    c. an opening in said charging box for receiving foam;
    d. tamper means over said charging box to provide sufficient clearance between a tamper plate of said tamper means and said opening of said charging box for loading material into said charging box;
    e. said ram means having sufficient power to compress foam material having internal cells to collapse the cells and overcome the form memory of the foam and produce a finished foam bale; and,
    f. said ram means having sufficient power to form said finished foam bale achieving a density of at least 10 pounds per cubic foot.

4. A baler for baling polystyrene foam material comprising:
    a. a baler including a charging chamber and a compression chamber next to said charging chamber, a door at one end of said compression chamber and a ram means at one end of said charging chamber for compressing foam material with sufficient force to collapse cells within the foam and overcome form memory of the foam and to produce a finished foam bale;
    b. a tamper box affixed above said charging box and including a hopper affixed above said tamper box;
    c. a tamper with a platen supported on said tamper box and hydraulic means for traveling said tamper box from a rest position at least above said ram means to said ram means whereby said platen precompresses the material into said charging box; and,
    d. said finished foam bale of baled polystrene having a density of 10–20 pounds per cubic foot.

5. A baling system for baling polystrene foam having internal cells comprising:
    a. a bale chamber with a bale door at one end, a charging box for gathering material for the bale chamber, and a movable ram for moving material from the charging box into the bale chamber;
    b. means for compressing material from said charging box into said baling chamber and against the bale door, and for collapsing the cells within the foam material at a predetermined first pressure;
    c. wherein said means for compressing material achieves a bale density of at least 10 pounds per cubic foot of baled polystyrene foam;
    d. means for determining when sufficient material is present for baling; and,
    e. means for compressing material in the baling chamber against the bale door at a second predetermined pressure said second predetermined pressure being greater than said first predetermined pressure.

* * * * *

UNITED STATES PATENT AND TRADEMARK OFFICE
CERTIFICATE OF CORRECTION

PATENT NO. : 5,317,965
DATED : June 7, 1994
INVENTOR(S) : Forrest Wildes, et al

It is certified that error appears in the above-indentified patent and that said Letters Patent is hereby corrected as shown below:

```
    Column 4, line 31, after the word "FIGS."
delete [SA] and insert -- 5A --.

Column 4, line 31, after the word "and"
delete [SB] and insert -- 5B --.

Column 9, line 30, after the word "for"
delete [elc-] and insert -- elec --.

Column 11, line 45, before the word
"providing" delete [d.] and insert -- c. --.
```

Signed and Sealed this

Seventeenth Day of October, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,317,965
DATED : June 7, 1995
INVENTOR(S) : Forrest Wildes, Wayne Maki, Chris A. Jefferson It is certified that error appears in the above-indentified patent and that said Letters Patent is hereby corrected as shown below:

Column 1, line 6, after the word "Feb." delete [8,] and insert -- 5, --.

Signed and Sealed this

Thirteenth Day of February, 1996

Attest:

BRUCE LEHMAN

*Attesting Officer*    *Commissioner of Patents and Trademarks*